(12) United States Patent
Zhang et al.

(10) Patent No.: US 7,231,062 B2
(45) Date of Patent: Jun. 12, 2007

(54) IMAGE PROCESSING APPARATUS, IMAGE PROCESSING SYSTEM, ELECTRONIC INFORMATION APPARATUS, IMAGE PROCESSING METHOD, CONTROL PROGRAM, AND COMPUTER-READABLE RECORDING MEDIUM

(75) Inventors: Xiaomang Zhang, Tenri (JP); Akira Yamanishi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 831 days.

(21) Appl. No.: 10/420,900

(22) Filed: Apr. 23, 2003

(65) Prior Publication Data

US 2003/0215111 A1 Nov. 20, 2003

(30) Foreign Application Priority Data

Apr. 23, 2002 (JP) .............................. 2002-121509

(51) Int. Cl.
*G06K 9/00* (2006.01)
(52) U.S. Cl. ..................... 382/100; 382/232; 713/176
(58) Field of Classification Search ................ 382/100, 382/232; 713/176
See application file for complete search history.

(56) References Cited

U.S. PATENT DOCUMENTS

| | | | | |
|---|---|---|---|---|
| 6,175,639 B1* | 1/2001 | Satoh et al. | ................. | 382/100 |
| 6,611,608 B1* | 8/2003 | Wu et al. | ................... | 382/100 |
| 6,693,965 B1* | 2/2004 | Inoue et al. | ........... | 375/240.19 |
| 7,095,874 B2* | 8/2006 | Moskowitz et al. | .......... | 382/10 |
| 2001/0026616 A1* | 10/2001 | Tanaka | ........................ | 380/202 |
| 2005/0025334 A1* | 2/2005 | Tewfik et al. | ................ | 382/100 |

FOREIGN PATENT DOCUMENTS

| | | |
|---|---|---|
| JP | 7-168927 A | 7/1995 |
| JP | 11-252564 A | 9/1999 |
| JP | 2000-50048 A | 2/2000 |

OTHER PUBLICATIONS

Dong, Gang, "Watermarking Technology Verified by Using Digital Image Authentication," Teinjin University, Master Degree Thesis, May 1, 2001.
Yeung, Minerva M. et al, IEEE, 1997, pp. 680-683.
Wong, Ping Wah, IEEE, 1998, pp. 455-459.

* cited by examiner

*Primary Examiner*—Bhavesh M Mehta
*Assistant Examiner*—Anand Bhatnagar
(74) *Attorney, Agent, or Firm*—Birch, Stewart, Kolasch & Birch, LLP

(57) ABSTRACT

The watermark insertion section divides the quantized DCT coefficients into at least two data streams, and modifies values of AC components of the data streams, so as to embed the watermark information in each block of the image information with the DCT coefficients quantized. The modification is performed as follows. The sum of a plurality of data of each data stream (or the sum of a plurality of data of a prescribed portion of each data stream) is divided by 2. Then, a value of an AC component of each data stream is modified such that the value of each remainder (the value of the LSB) has a prescribed relationship with (for example, is equal to) the value of the watermark information. Specifically, the value of the first non-zero AC component, from the trailing end of each data stream, is processed by addition of 1 or subtraction of 1.

29 Claims, 22 Drawing Sheets

Original image (uncompressed)
↓
Block dividing section — 11
↓
DCT section — 12
↓
Quantization section — 13
↓
Watermark insertion section — 14
↓
Watermarked image (Uncompressed)

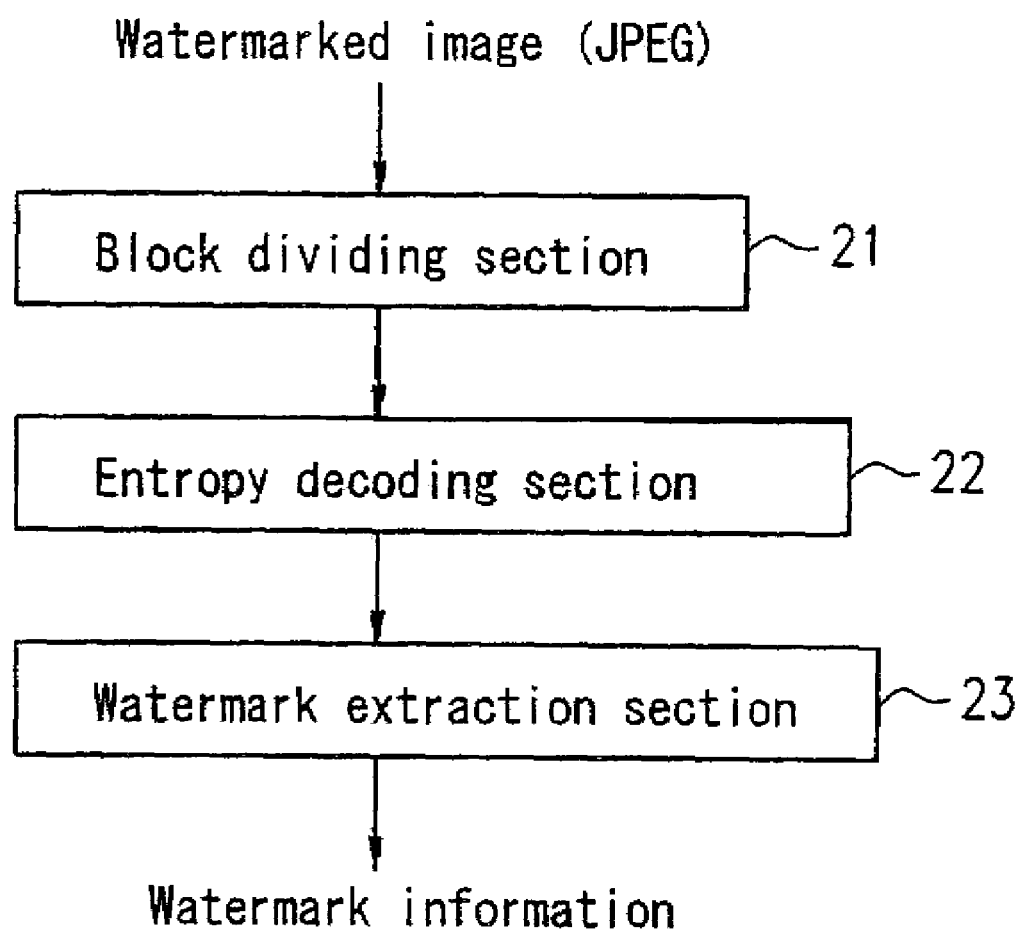

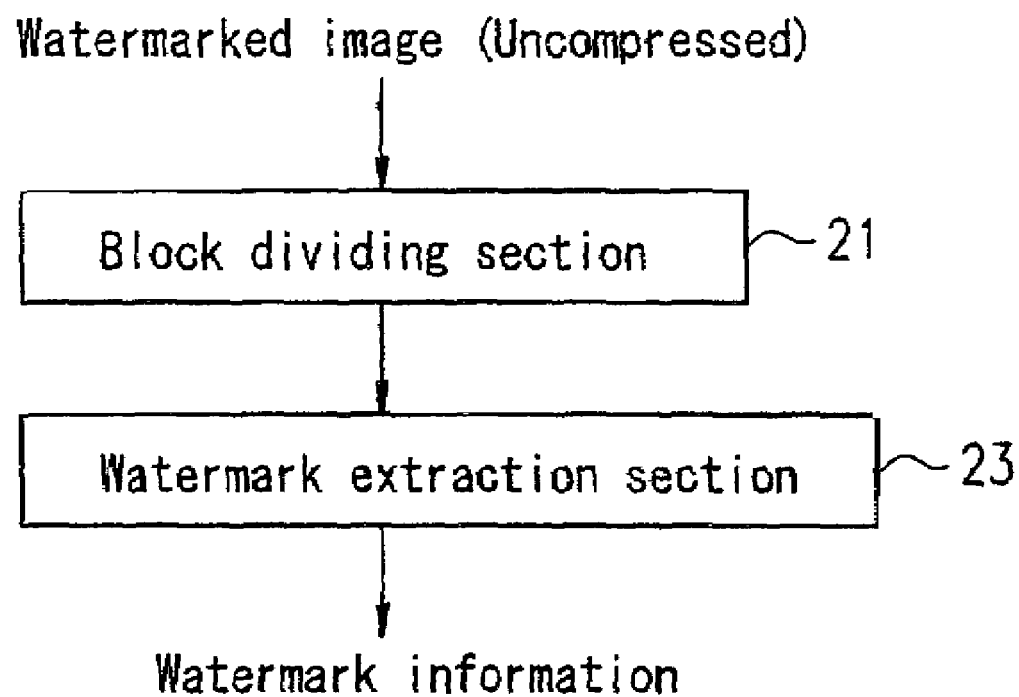

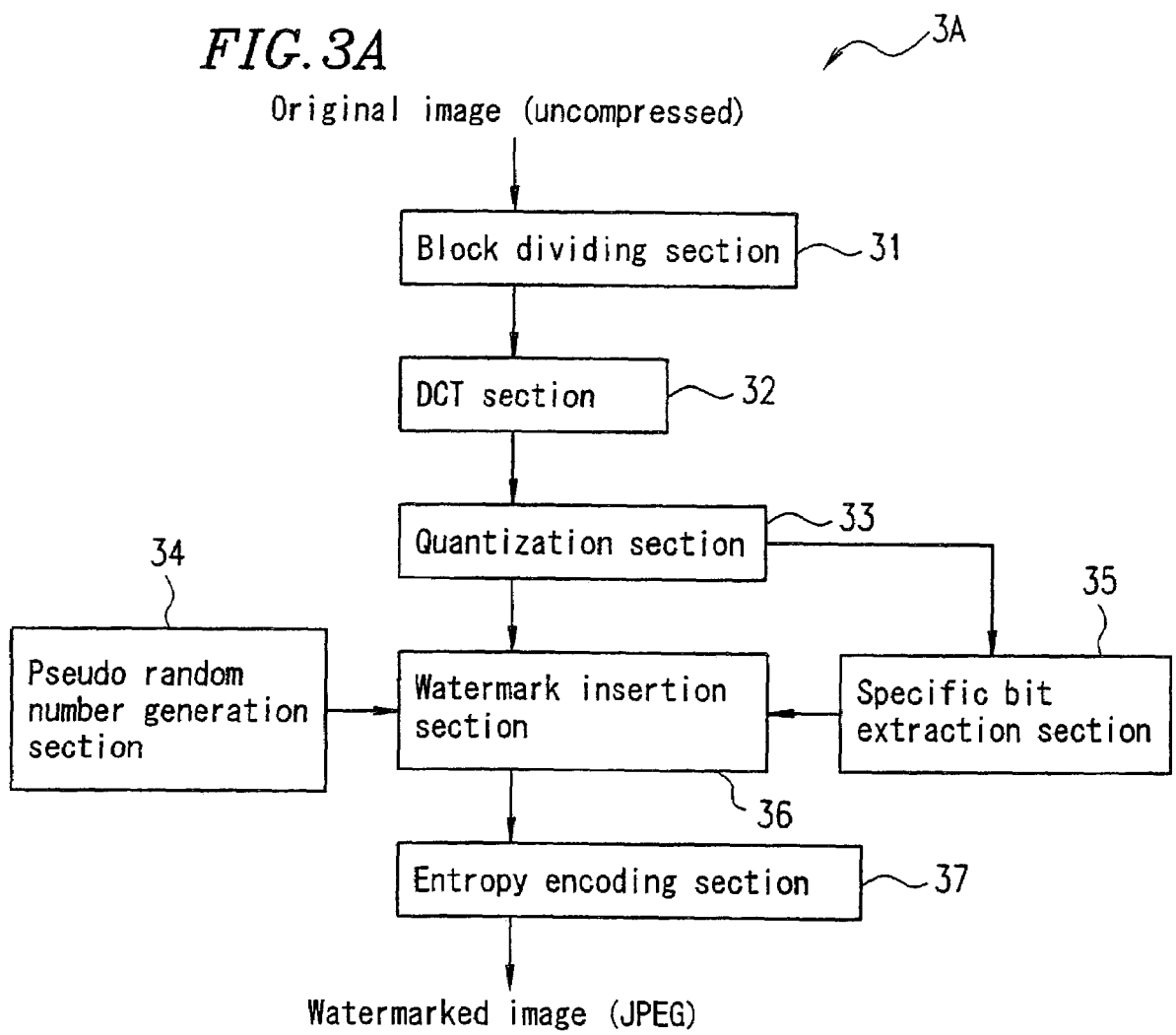

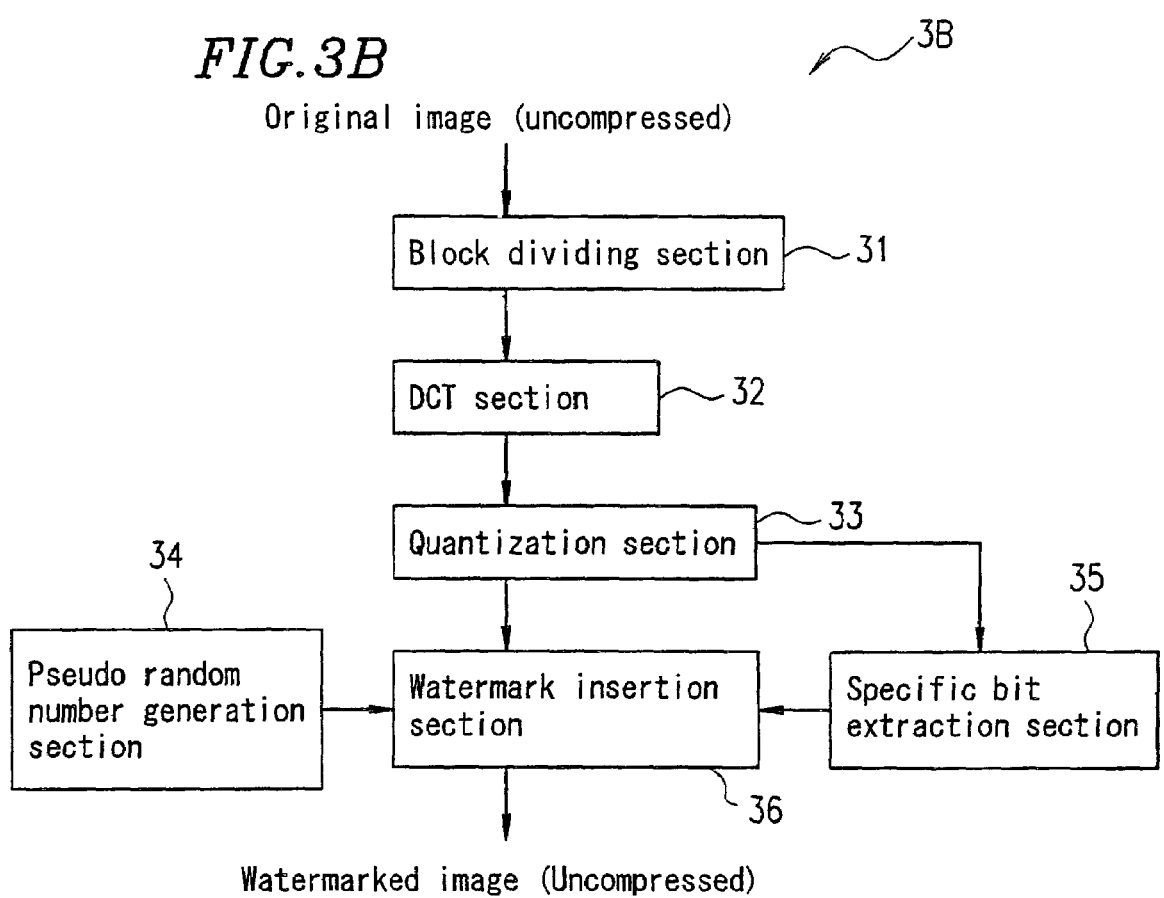

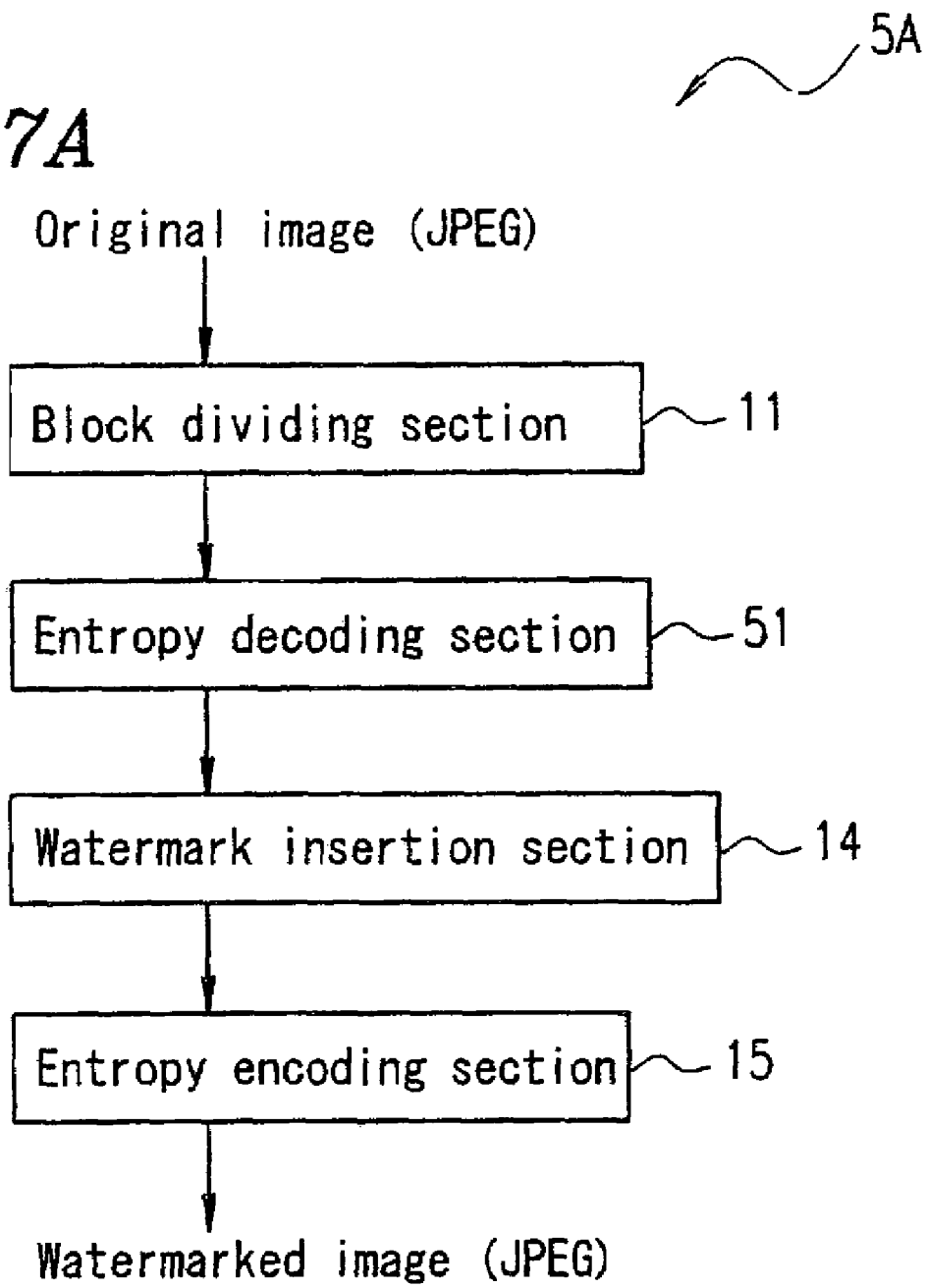

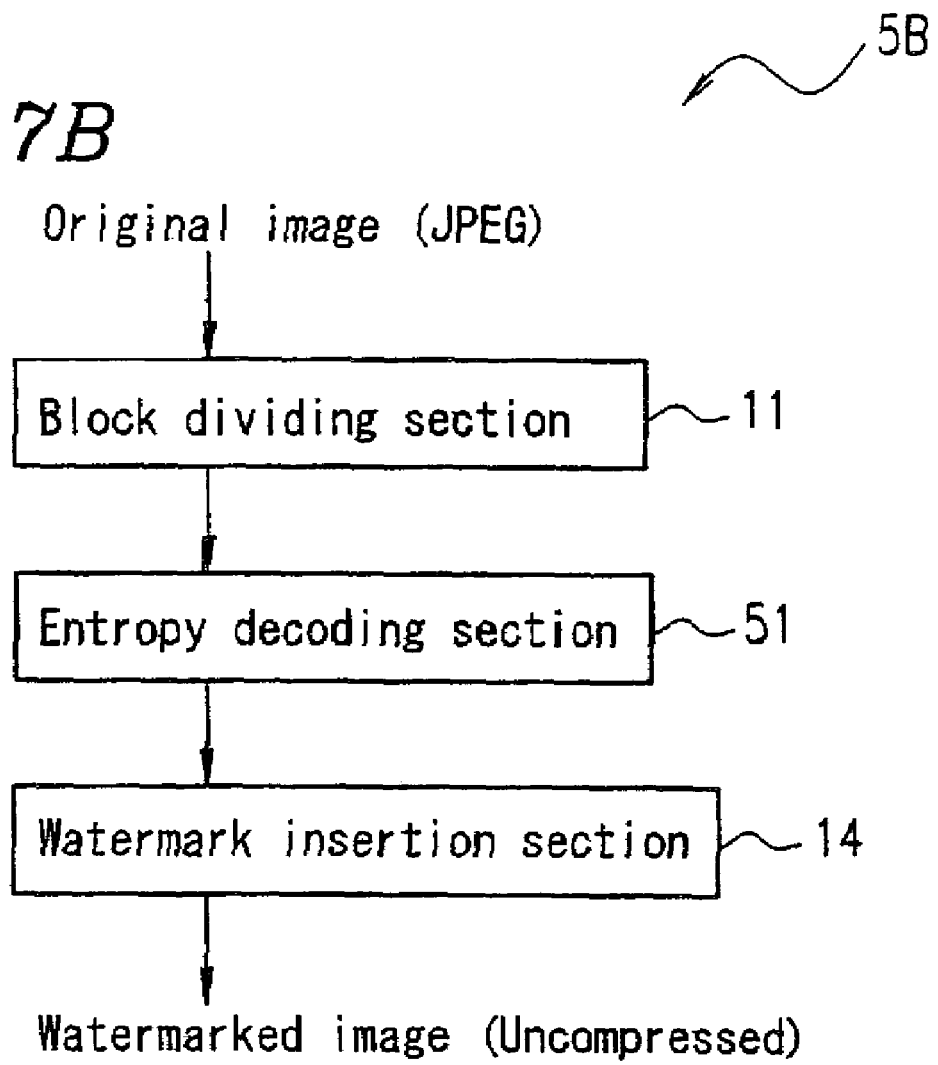

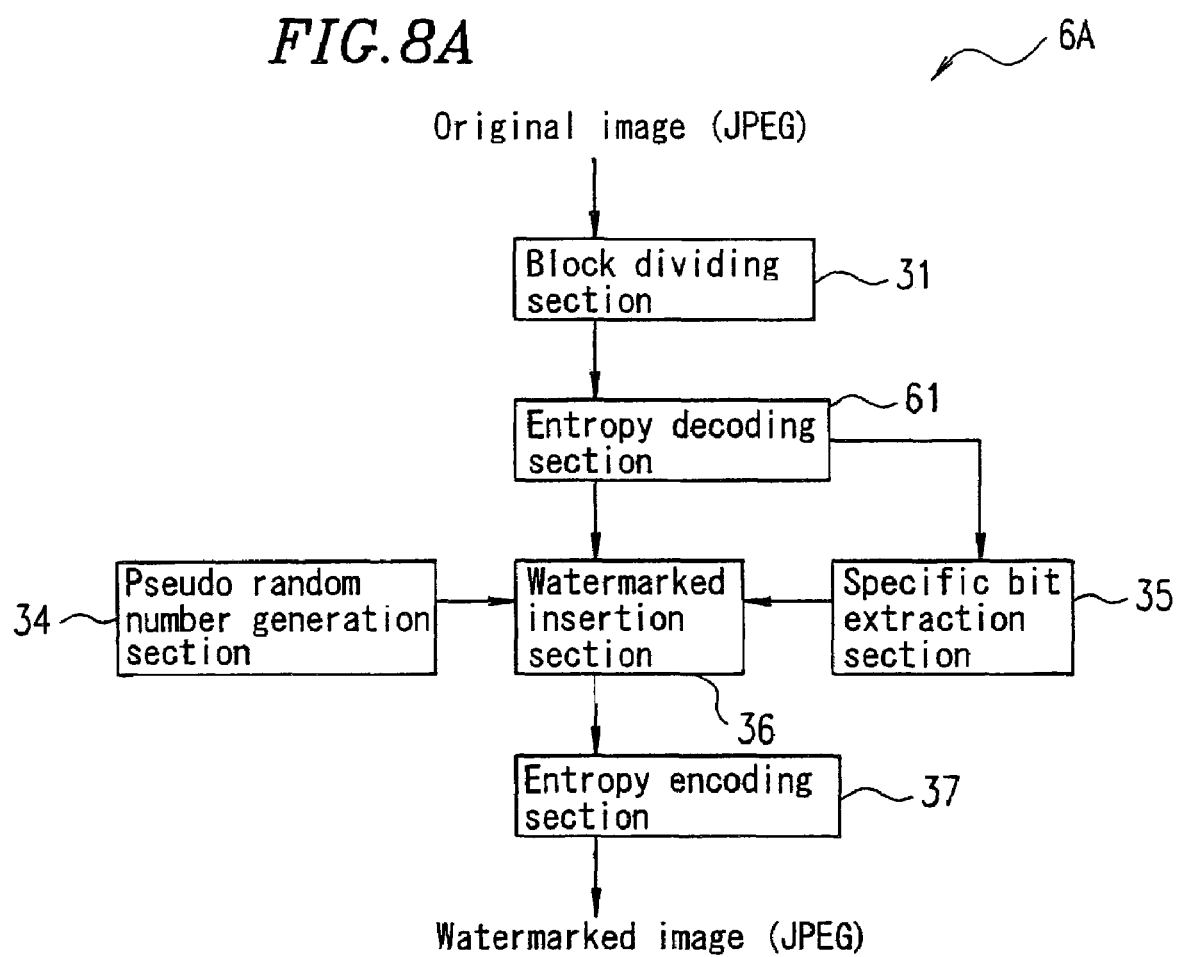

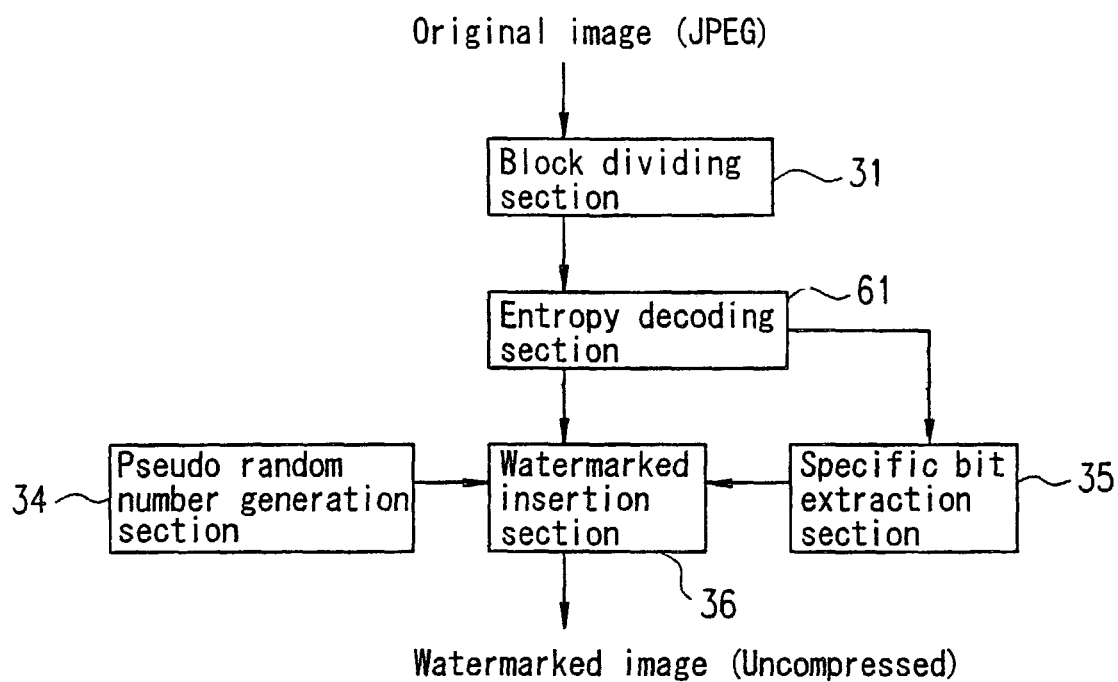

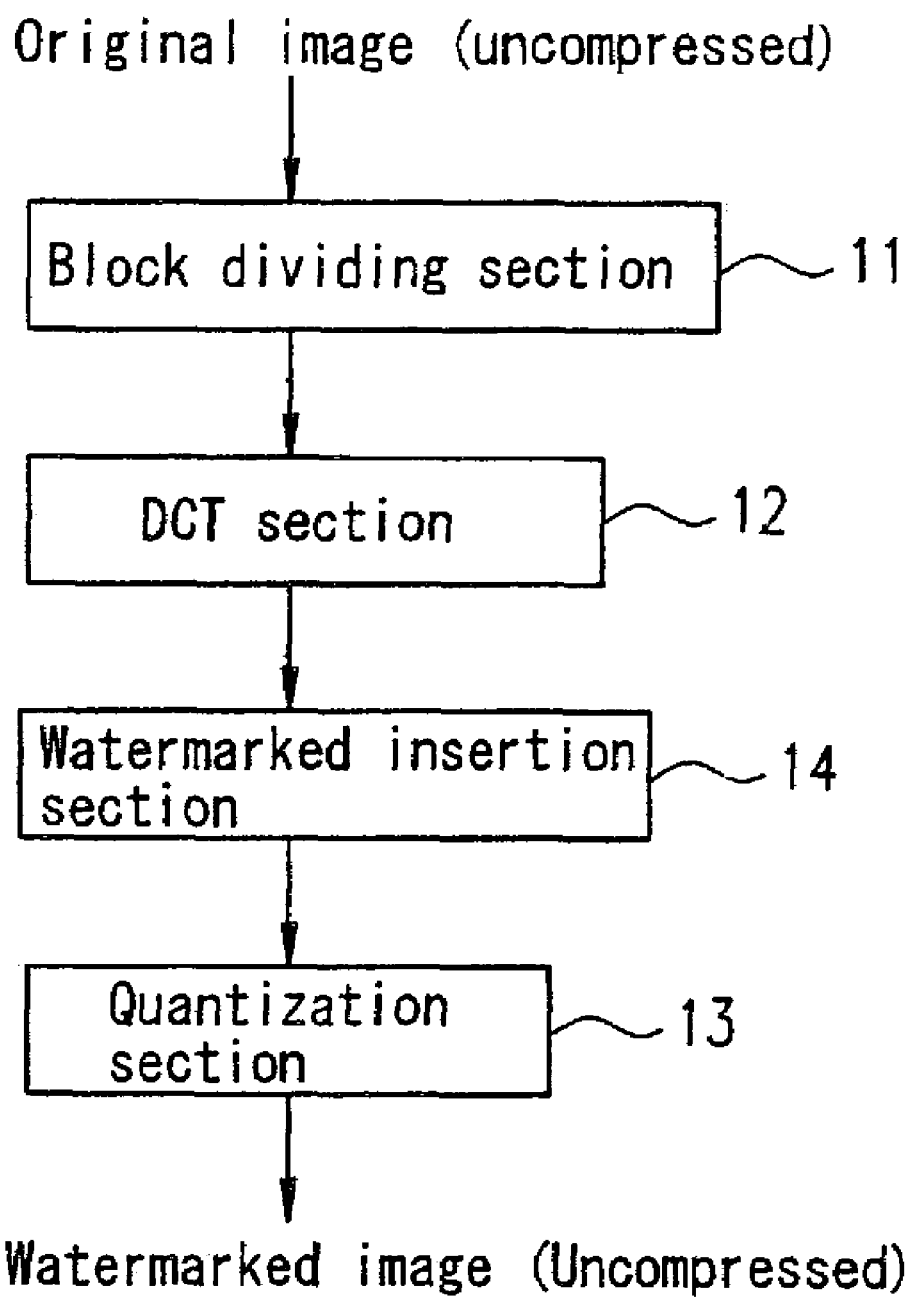

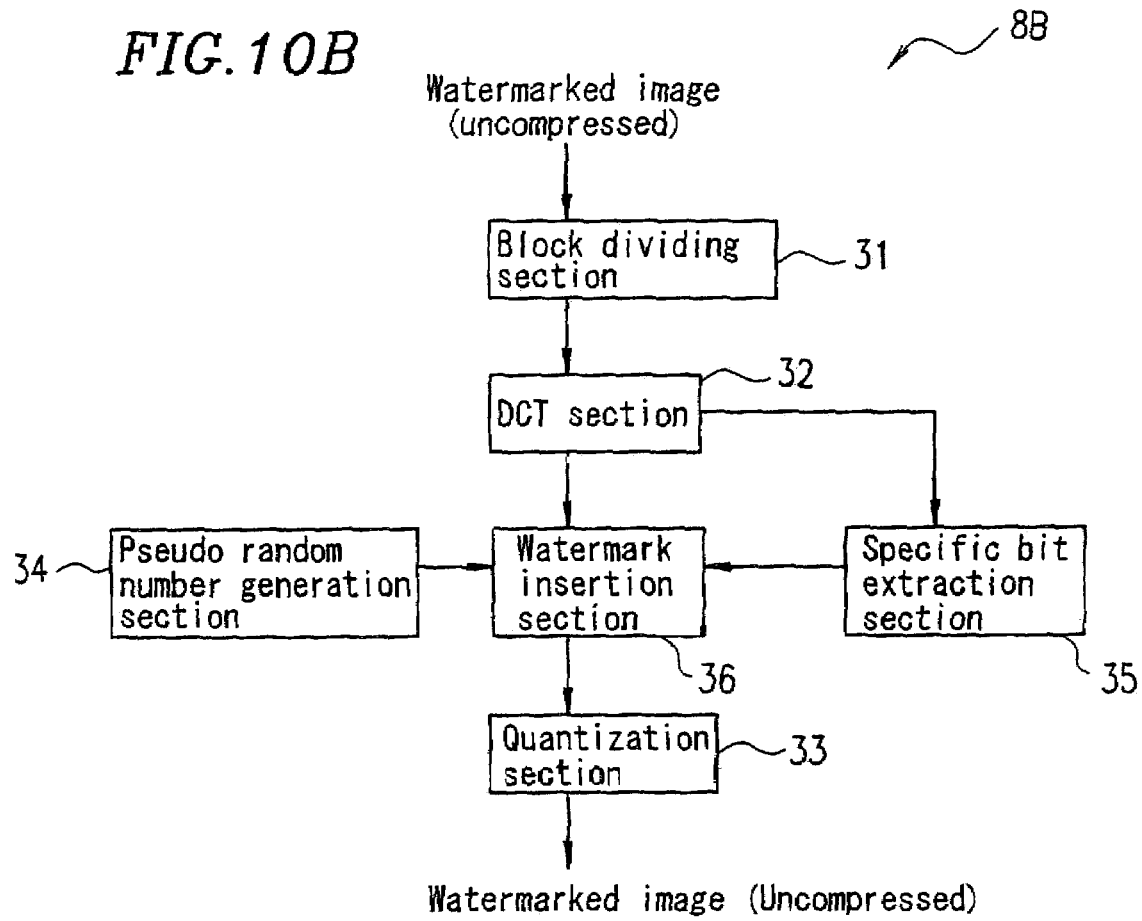

*Prior art*

IMAGE PROCESSING APPARATUS, IMAGE PROCESSING SYSTEM, ELECTRONIC INFORMATION APPARATUS, IMAGE PROCESSING METHOD, CONTROL PROGRAM, AND COMPUTER-READABLE RECORDING MEDIUM

BACKGROUND OF THE INVENTION

1. Field of the Invention

The present invention relates to an image processing apparatus, an image processing system, and an image processing method for embedding watermark information and/or detecting embedded watermark information in order to, for example, authenticate an original image; a control program for allowing a computer to execute the embedding and/or detection processing; a computer-readable recording medium having the control program stored thereon; and an electronic information apparatus using the same, for example, a digital camera.

2. Description of the Related Art

The above-mentioned type of image processing apparatus recognizes whether an image is an original image or not by embedding digital watermark information (hereinafter, also referred to simply as "watermark information"), which does not have any direct influence on the image, and then detecting the embedded watermark information. There are two types of watermark information, i.e., strong watermark information and weak watermark information. Strong watermark information is not erased even when the image data in which the watermark information is embedded is changed, and thus is used for, for example, copyright protection. Strong watermark information, when verified, can be used to assert copyright of an original image. Weak watermark information is erased when the image data in which the watermark information is embedded is changed, and thus is used for authentication of an original image. Herein, the term "digital watermark information" or "watermark information" refers to weak watermark information.

M. Yeung and F. Mintzer proposed a principle of weak watermark technology in "An Invisible Watermarking Technique for Image Verification", Proceedings of ICIP, Santa Barbara, Calif., Oct. 26-29, 1997, Vol. 2, pp. 680-683". FIGS. 11 and 12 show technology for embedding and detecting watermark information proposed in the above-mentioned publication (hereinafter, referred to as "conventional technology 1").

FIG. 11 is a functional diagram illustrating a procedure performed by a conventional watermark information embedding apparatus 100 used in conventional technology 1. The watermark information embedding apparatus 100 embeds watermark image information (watermark information) in original image information, so as to obtain watermarked image information. This will be described in more detail.

For an original image and a binary watermark image having the same size as that of the original image, a watermark extraction function is obtained. The original image is processed by calculations defined by the extraction function on a pixel-by-pixel basis. A look-up table LUT is used as a random number table 101 which uses a random number as a key. The look-up table LUT receives, for example, an 8-bit input for a gray-scale image, and provides a 2-bit ("1" or "0") output, on a pixel-by-pixel basis. The result of the calculation performed on the original image is input to the look-up table LUT and binarized. The binary value thus obtained is compared with a binary value obtained from the watermark information to be embedded in the original image by a comparison section 102. When the two binary values match each other, the pixel value of the original image (the 8-bit gray-scale value) is kept as it is. When the two binary values do not match each other, the pixel value of the original image is repeatedly adjusted by a pixel value adjusting section 103 until the two binary values match each other. Thus, a watermarked image is created.

FIG. 12 is a functional diagram illustrating a procedure performed by a conventional watermark information detection apparatus 110 used in conventional technology 1. Referring to FIG. 12, the watermark information detection apparatus 110 includes a random number table section 111 (look-up table LUT) which is similar to the random number table section 101 described above. The random number table section 111 is used to extract watermark information (watermark image) from the watermarked image information. More particularly, the watermarked image is processed by calculations defined by the extraction function obtained at the time of embedding, and the obtained calculation result is mapped by the random number table 111. Thus, the watermark image is obtained. The resultant binary image is examined so as to check whether the original image has been changed.

P. W. Wong proposed weak watermark technology in P. W. Wong, "A Public Key Watermark for Image Verification and Authentication", Proceedings of ICIP, 1998, Chicago, pp. 455-459. FIGS. 13 and 14 show technology for embedding and detecting watermark information proposed in the above-mentioned publication (hereinafter, referred to as "conventional technology 2").

FIG. 13 is a functional block diagram illustrating a procedure performed by a conventional watermark information embedding apparatus 200 used in conventional technology 2. The watermark information embedding apparatus 200 embeds watermark image information as follows.

A gray-scale original image and a binary watermark image are each divided into blocks each having n×n pixels (for example, 8×8 pixels). "n" is a natural number. The LSB (least significant bit) of the value of each block is set to zero. Then, based on parameters such as the remaining upper bits and the image size, a hash function is created so as to generate a value reflecting the block. The first n×n bits from the bit stream of the generated value are selected. An exclusive-OR (EXOR) of the selected n×n bits and the value of the watermark information corresponding to the selected n×n bits is obtained. The calculation result is encrypted using a secret key of a public key cryptography system (for example, RSA). The calculation result is written in the LSB of the original image. Thus, the embedding of the watermark information is completed.

FIG. 14 is a functional block diagram illustrating a procedure performed by a conventional watermark information detection apparatus 210 used in conventional technology 2. Referring to FIG. 14, the watermark information extraction is performed on a block-by-block basis like the embedding of the watermark information. Using the same hash function, bits other than the LSBs of the watermark image information, the image size and other sequences are calculated, and the first n×n bits of the calculation result are selected. Then, the LSBs are translated using the public key. An exclusive-OR (EXOR) of the resultant bit stream and the selected bit stream is obtained. The resultant logical operation result is the extracted watermark image information.

Japanese Laid-Open Publication No. 2000-50048 entitled "Image Processing Device" was proposed as conventional technology 3. This image processing device includes a compression/watermark addition section. The compression/ watermark addition section includes block dividing means for dividing one original image into a plurality of pixel blocks; frequency transform means for transforming digital image data of each pixel block into a frequency so as to generate frequency image data; quantization means for quantizing the frequency image data so as to generate quantized data; a bit embedding section for receiving a quantized coefficient matrix obtained from the quantized data, information to be embedded (watermark information) and key information, so as to add the watermark information to one of the quantized coefficients in the matrix which is determined by a random number based on prescribed key information; and encoding means for encoding the embedded quantized data so as to generate compressed data. The bit embedding section includes a random number sequence generation section for generating a random number sequence having the key information as an initial value, a determination section for determining one quantization coefficient to be embedded from the quantized coefficient matrix as the quantized frequency image using the generated random number sequence, and a changing section for changing the determined quantized coefficient to be embedded so as to provide an embedded quantized coefficient matrix.

The conventional weak watermark technology (conventional technology 1) of Yeung et al. uses the values generated by the look-up table LUT using random numbers. The pixel value is adjusted so as to reflect the binary value of the watermark information. This method involves a problem in that the image quality of the watermarked image may be adversely affected depending on the value generated by the look-up table LUT.

With reference to FIG. 15, the adverse effect on the watermarked image will be described. FIG. 15 does not show the extraction function for the sake of simplicity.

As shown in FIG. 15, an 8-bit input of a gray-scale original image (0 through 255) received by the look-up table LUT is randomly output as "1" or "0". When this binary output matches the binary value of the watermark information, the pixel value of the original image is kept as it is. When the two binary values do not match each other, the pixel value is repeatedly adjusted until the two values match each other.

For example, it is assumed that the gray-scale input is "020" and the binary output is "1". Assuming that the value of the watermark information is "0", the two binary values do not match each other. If the next gray-scale value "021" and the binary output is "0", the image quality is not adversely affected since there is no significant difference between the gray-scale values "020" and "021". If there is no binary output "0" corresponding to the subsequent gray-scale values "021" to "101", the gray-scale value "020" needs to be adjusted to the gray-scale value "101" although these two values are significantly different from each other. Such an adjustment of a gray-scale value to a significantly different value adversely influences the image quality of the original image. Furthermore, according to conventional technology 1, the outputs corresponding to the gray-scale values 0 through 255 of the original image are merely roughly divided into "1" and "0". Even though the original image is changed within a range of the 8-bit inputs corresponding to the output "1", such a change cannot be detected since the output is still "1" despite the change in the original image.

The weak watermark technology proposed by Wong (conventional technology 2) has the following problem. Watermark information is embedded in the LSBs of a flat image in which the gray-scale values (for example, 8-bit values) of the pixels are the same, on a block-by-block basis, each block having n×n pixels. According to this method, the image data is uniform except for the watermark information. Therefore, the method in which the watermark has been embedded, the watermark information itself, and the like are likely to be revealed. This may give a clue to assist forgery of the watermark information.

Conventional technologies 1 and 2 cannot be used for data-compressed images. Uncompressed data requires enormous storage capacity, and thus in actuality, image data is compressed in one way or another. The conventional technologies 1 and 2 are unpractical.

According to conventional technology 3, weak watermark technology is applied to data-compressed images. However, it is determined at random at which position of the quantized coefficient matrix in each divided block (for example, 8×8 pixels) the watermark information is to be embedded. Therefore, when the original data is changed at positions other than the position having the watermark information embedded therein, such a change cannot be detected. In addition, in the case where the watermark information is embedded the position of a DC component, which influences the image quality, instead of the position of an AC component, such a change may influence the image quality.

SUMMARY OF THE INVENTION

According to one aspect of the invention, an image processing apparatus for detectably embedding prescribed watermark information in original image information includes an original image information dividing section for dividing the original image information into n×n blocks (n is a natural number); a discrete cosine transform section for performing discrete cosine transforms of the image information on a block-by-block basis; a quantization section for quantizing discrete cosine coefficients produced by the discrete cosine transform; and a watermark information embedding section for dividing the quantized discrete cosine coefficients into at least two data streams, and setting the value of an AC component of each of the data streams such that the value of the least significant bit of the sum of a plurality of data of each of the data streams, or the value of the least significant bit of the sum of a plurality of data of a prescribed portion of each of the data streams, is in a prescribed relationship with the value of the watermark information, so as to embed the watermark information in the original image information. Each of the plurality of data corresponds to a pixel.

According to another aspect of the invention, an image processing apparatus for detecting prescribed watermark information embedded in original image information includes an image information dividing section for dividing the image information having the watermark information embedded therein into n×n blocks (n is a natural number); and a watermark information detection section for dividing post-division discrete cosine coefficients into at least two data streams, and detecting the watermark information depending on whether the values of the least significant bits of the sums of a plurality of data of the data streams, or the values of the least significant bits of sums of a plurality of data of prescribed portions of the data streams, are in a prescribed relationship with each other.

According to still another aspect of the invention, an image processing apparatus for detectably embedding prescribed watermark information in original image information includes an original image information dividing section for dividing the original image information into n×n blocks (n is a natural number): a discrete cosine transform section for performing discrete cosine transforms of the image information on a block-by-block basis; a quantization section for quantizing discrete cosine coefficients produced by the discrete cosine transform; a pseudo random number generation section for generating at least a first pseudo random number and a second pseudo random number; a specific bit extraction section for extracting a specific bit from a DC coefficient of the quantized discrete cosine coefficients; and a watermark information embedding section for dividing the quantized discrete cosine coefficients into at least a first data stream and a second data stream; setting the value of an AC component of the first data stream such that the value of the least significant bit of the sum of a plurality of data of the first data stream, or the value of the least significant bit of the sum of a plurality of data of a prescribed portion of the first data stream, is in a prescribed relationship with the exclusive-OR or the exclusive-NOR of the value of the watermark information, the value of the specific bit, and the value of the first pseudo random number; and setting the value of an AC component of the second data stream such that the value of the least significant bit of the sum of a plurality of data of the second data stream, or the value of the least significant bit of the sum of a plurality of data of a prescribed portion of the second data stream, is in a prescribed relationship with the exclusive-OR or the exclusive-NOR of the value of the watermark information, the value of the specific bit, and the value of the second pseudo random number; so as to embed the watermark information in the original image information.

According to still another aspect of the invention, an image processing apparatus for detecting prescribed watermark information embedded in original image information includes an image information dividing section for dividing the image information having the watermark information embedded therein into n×n blocks (n is a natural number); a pseudo random number generation section for generating at least a first pseudo random number and a second pseudo random number; a specific bit extraction section for extracting a specific bit from a DC coefficient of post-division discrete cosine coefficients; a watermark information detection section for dividing the post-division discrete cosine coefficients into at least a first data stream and a second data stream, and detecting the watermark information depending on whether the exclusive-OR or the exclusive-NOR of the value of the least significant bit of the sum of a plurality of data of the first data stream or the value of the least significant bit of the sum of a plurality of data of a prescribed portion of the first data stream, the value of the specific bit, and the value of the first pseudo random number is in a prescribed relationship with the exclusive-OR or the exclusive-NOR of the value of the least significant bit of the sum of a plurality of data of the second data stream or the value of the least significant bit of the sum of a plurality of data of a prescribed portion of the second data stream, the value of the specific bit, and the value of the second pseudo random number.

According to still another aspect of the invention, an image processing apparatus for detectably embedding prescribed watermark information in data-compressed image information includes an image information dividing section for dividing the data-compressed image information into n×n blocks (n is a natural number); a data decompression section for decoding data of each of the divided blocks; and a watermark information embedding section for dividing decoded discrete cosine coefficients into at least two data streams, and setting the value of an AC component of each of the data streams such that the value of the least significant bit of the sum of a plurality of data of each of the data streams, or the value of the least significant bit of the sum of a plurality of data of a prescribed portion of each of the data streams, is in a prescribed relationship with the value of the watermark information, so as to embed the watermark information in the data-compressed image information.

According to still another aspect of the invention, an image processing apparatus for detectably embedding prescribed watermark information in data-compressed image information includes an image information dividing section for dividing the data-compressed image information into n×n blocks (n is a natural number); a data decompression section for decoding data of each of the divided blocks; a pseudo random number generation section for generating at least a first pseudo random number and a second pseudo random number; a specific bit extraction section for extracting a specific bit from a DC coefficient of decoded discrete cosine coefficients; and a watermark information embedding section for dividing the decoded discrete cosine coefficients into at least a first data stream and a second data stream; setting the value of an AC component of the first data stream such that the value of the least significant bit of the sum of a plurality of data of the first data stream, or the value of the least significant bit of the sum of a plurality of data of a prescribed portion of the first data stream, is in a prescribed relationship with the exclusive-OR or the exclusive-NOR of the value of the watermark information, the value of the specific bit, and the value of the first pseudo random number; and setting the value of an AC component of the second data stream such that the value of the least significant bit of the sum of a plurality of data of the second data stream, or the value of the least significant bit of the sum of a plurality of data of a prescribed portion of the second data stream, is in a prescribed relationship with the exclusive-OR or the exclusive-NOR of the value of the watermark information, the value of the specific bit, and the value of the second pseudo random number; so as to embed the watermark information in the data-compressed image information.

According to still another aspect of the invention, an image processing apparatus for detectably embedding prescribed watermark information in original image information includes an original image information dividing section for dividing the original image information into n×n blocks (n is a natural number); a discrete cosine transform section for performing discrete cosine transforms of the image information on a block-by-block basis; a watermark information embedding section for dividing the discrete cosine coefficients produced by the discrete cosine transform into at least two data streams, and setting the value of an AC component of each of the data streams such that the value of the least significant bit of the sum of a plurality of data of each of the data streams, or the value of the least significant bit of the sum of a plurality of data of a prescribed portion of each of the data streams, is in a prescribed relationship with the value of the watermark information, so as to embed the watermark information in the original image information.

According to still another aspect of the invention, an image processing apparatus for detectably embedding prescribed watermark information in original image information includes an original image information dividing section for dividing the original image information into n×n blocks (n is a natural number); a discrete cosine transform section for performing discrete cosine transforms of the image information on a block-by-block basis; a pseudo random number generation section for generating at least a first pseudo random number and a second pseudo random number; a specific bit extraction section for extracting a specific bit from a DC coefficient of discrete cosine coefficients produced by the discrete cosine transform; and a watermark information embedding section for dividing the discrete cosine coefficients produced by the discrete cosine transform into at least a first data stream and a second data stream; setting the value of an AC component of the first data stream such that the value of the least significant bit of the sum of a plurality of data of the first data stream, or the value of the least significant bit of the sum of a plurality of data of a prescribed portion of the first data stream, is in a prescribed relationship with the exclusive-OR or the exclusive-NOR of the value of the watermark information, the value of the specific bit, and the value of the first pseudo random number; and setting the value of an AC component of the second data stream such that the value of the least significant bit of the sum of a plurality of data of the second data stream, or the value of the least significant bit of the sum of a plurality of data of a prescribed portion of the second data stream, is in a prescribed relationship with the exclusive-OR or the exclusive-NOR of the value of the watermark information, the value of the specific bit, and the value of the second pseudo random number; so as to embed the watermark information in the original image information.

In one embodiment of the invention, the image processing apparatus further includes a quantization section for quantizing the discrete cosine coefficients after the watermark information is embedded.

In one embodiment of the invention, the image processing apparatus further includes a data compression section for encoding data after the watermark information is embedded and after the discrete cosine coefficients are quantized.

In one embodiment of the invention, the image processing apparatus further includes a data decompression section for decoding data of each of the divided blocks, wherein the watermark information detection section operates using the decoded data.

In one embodiment of the invention, the prescribed relationship is such that the value of the least significant bit of the sum of a plurality of data of each of the data streams, or the value of the least significant bit of the sum of a plurality of data of a prescribed portion of each of the data streams, is equal to or different from the value of the watermark information.

In one embodiment of the invention, the value of the AC component is set by adding 1 to, or subtracting 1 from, the first non-zero AC component in a direction from a trailing end toward a leading end of each of the data streams.

In one embodiment of the invention, the prescribed relationship is such that the value of the least significant bit of the sum of a plurality of data of the first data stream, or the value of the least significant bit of the sum of a plurality of data of a prescribed portion of the first data stream, is equal to or different from the exclusive-OR or the exclusive-NOR of the value of the watermark information, the value of the specific bit, and the value of the first pseudo random number; and such that the value of the least significant bit of the sum of a plurality of data of the second data stream, or the value of the least significant bit of the sum of a plurality of data of a prescribed portion of the second data stream, is equal to or different from the exclusive-OR or the exclusive-NOR of the value of the watermark information, the value of the specific bit, and the value of the second pseudo random number.

In one embodiment of the invention, the value of the AC component of the first data stream is set by adding 1 to, or subtracting 1 from, the first non-zero AC component in a direction from the trailing end toward the leading end of the first data stream, and the value of the AC component of the second data stream is set by adding 1 to, or subtracting 1 from, the first non-zero AC component in a direction from the trailing end toward the leading end of the second data stream.

In one embodiment of the invention, the exclusive-OR is the exclusive-OR: of the exclusive-OR of two out of three inputs of (i) the value of the watermark information, (ii) the value of the specific bit, and (iii) the value of the first or the second pseudo random number, and the remaining one input. The exclusive-NOR is a negative value of the exclusive-OR of: a negative value of the exclusive-OR of two out of three inputs of (i) the value of the watermark information, (ii) the value of the specific bit, and (iii) the value of the first or the second pseudo random number, and a the remaining one input.

In one embodiment of the invention, the sum of a plurality of data of each of the data streams, or the sum of a plurality of data of a prescribed portion of each of the data streams, is the sum of a plurality of data, each including the value of its least significant bit, of the data streams, or the sum of a plurality of data, each including the value of its least significant bit, of a prescribed portion of each of the data streams.

According to still another aspect of the invention, an image processing system includes a watermark information embedding section for dividing the quantized discrete cosine coefficients into at least two data streams, and setting the value of an AC component of each of the data streams such that the value of the least significant bit of the sum of a plurality of data of each of the data streams, or the value of the least significant bit of the sum of a plurality of data of a prescribed portion of each of the data streams, is in a prescribed relationship with the value of the watermark information, so as to embed the watermark information in the original image information; and a watermark information detection section for dividing post-division discrete cosine coefficients into at least two data streams, and detecting the watermark information depending on whether the values of the least significant bits of the sums of a plurality of data of the data streams, or the values of the least significant bits of sums of a plurality of data of prescribed portions of the data streams, are in a prescribed relationship with each other.

According to still another aspect of the invention, an image processing system includes a watermark information embedding section for dividing the quantized discrete cosine coefficients into at least a first data stream and a second data stream; setting the value of an AC component of the first data stream such that the value of the least significant bit of the sum of a plurality of data of the first data stream, or the value of the least significant bit of the sum of a plurality of data of a prescribed portion of the first data stream, is in a prescribed relationship with the exclusive-OR or the exclusive-NOR of the value of the watermark information, the value of the specific bit, and the value of the first pseudo random number; and setting the value of an AC component of the second data stream such that the value of the least significant bit of the sum of a plurality of data of the second data stream, or the value of the least significant bit of the sum of a plurality of data of a prescribed portion of the second data stream, is in a prescribed relationship with the exclusive-OR or the exclusive-NOR of the value of the watermark information, the value of the specific bit, and the value of the second pseudo random number; so as to embed the watermark information in the original image information; and a watermark information detection section for dividing the post-division discrete cosine coefficients into at least a first data stream and a second data stream, and detecting the watermark information depending on whether the exclusive-OR or the exclusive-NOR of the value of the least significant bit of the sum of a plurality of data of the first data stream or the value of the least significant bit of the sum of a plurality of data of a prescribed portion of the first data stream, the value of the specific bit, and the value of the first pseudo random number is in a prescribed relationship with the exclusive-OR or the exclusive-NOR of the value of the least significant bit of the sum of a plurality of data of the second data stream or the value of the least significant bit of the sum of a plurality of data of a prescribed portion of the second data stream, the value of the specific bit, and the value of the second pseudo random number.

In one embodiment of the invention, an electronic information apparatus for embedding watermark information using one of the above-described image processing apparatuses is provided.

In one embodiment of the invention, an electronic information apparatus for detecting watermark information using one of the above-described image processing apparatuses is provided.

In one embodiment of the invention, an electronic information apparatus for embedding and detecting watermark information using one of the above-described image processing systems is provided.

According to still another aspect of the invention, an image processing method for detectably embedding prescribed watermark information in original image information includes the steps of dividing the original image information into n×n blocks (n is a natural number); performing discrete cosine transforms of the image information on a block-by-block basis; quantizing discrete cosine coefficients produced by the discrete cosine transform; dividing the quantized discrete cosine coefficients into at least two data streams, and setting the value of an AC component of each of the data streams such that the value of the least significant bit of the sum of a plurality of data of each of the data streams, or the value of the least significant bit of the sum of a plurality of data of a prescribed portion of each of the data streams, is in a prescribed relationship with the value of the watermark information, so as to embed the watermark information in the original image information; and encoding data after the watermark information is embedded for data compression.

According to another aspect of the invention, an image processing method for detecting prescribed watermark information embedded in original image information includes the steps of dividing the image information having the watermark information embedded therein into n×n blocks (n is a natural number); decoding data of each of the divided blocks for data decompression; and dividing decoded discrete cosine coefficients into at least two data streams; and detecting the watermark information depending on whether the values of the least significant bits of the sums of a plurality of data of the data streams, or the values of the least significant bits of sums of a plurality of data of prescribed portions of the data streams, are in a prescribed relationship with each other.

According to another aspect of the invention, an image processing method for detectably embedding prescribed watermark information in original image information includes the steps of dividing the original image information into n×n blocks (n is a natural number); performing discrete cosine transforms of the image information on a block-by-block basis; quantizing discrete cosine coefficients produced by the discrete cosine transform; generating at least a first pseudo random number and a second pseudo random number; extracting a specific bit from a DC coefficient of the quantized discrete cosine coefficients; dividing the quantized discrete cosine coefficients into at least a first data stream and a second data stream; setting the value of an AC component of the first data stream such that the value of the least significant bit of the sum of a plurality of data of the first data stream, or the value of the least significant bit of the sum of a plurality of data of a prescribed portion of the first data stream, is in a prescribed relationship with the exclusive-OR or the exclusive-NOR of the value of the watermark information, the value of the specific bit, and the value of the first pseudo random number; and setting the value of an AC component of the second data stream such that the value of the least significant bit of the sum of a plurality of data of the second data stream, or the value of the least significant bit of the sum of a plurality of data of a prescribed portion of the second data stream, is in a prescribed relationship with the exclusive-OR or the exclusive-NOR of the value of the watermark information, the value of the specific bit, and the value of the second pseudo random number; so as to embed the watermark information in the original image information; and encoding the data after the watermark information is embedded for data compression.

According to another aspect of the invention, an image processing method for detecting prescribed watermark information embedded in original image information includes the steps of dividing the image information having the watermark information embedded therein into n×n blocks (n is a natural number); generating at least a first pseudo random number and a second pseudo random number; decoding data of each of the divided blocks for data decompression; extracting a specific bit from a DC coefficient of post-division discrete cosine coefficients; and dividing the post-division discrete cosine coefficients into at least a first data stream and a second data stream; and detecting the watermark information depending on whether the exclusive-OR or the exclusive-NOR of the value of the least significant bit of the sum of a plurality of data of the first data stream or the sum of a plurality of data of a prescribed portion of the first data stream, the value of the specific bit, and the value of the first pseudo random number is in a prescribed relationship with the exclusive-OR or the exclusive-NOR of the value of the least significant bit of the sum of a plurality of data of the second data stream or the sum of a plurality of data of a prescribed portion of the second data stream, the value of the specific bit, and the value of the second pseudo random number.

According to another aspect of the invention, a control program describing a processing procedure for allowing a computer to execute one of the above-described image processing methods.

According to another aspect of the invention, a computer-readable recording medium having one of the above-described control programs recorded thereon.

According to the present invention, the quantized discrete cosine coefficients are divided into at least two data streams, and the value of an AC component of each of the data streams is set such that the value of the least significant bit of, for example, the sum of a plurality of data of each of the data streams is in a prescribed relationship with (for example, is equal to) the value of the watermark information. Thus, the watermark information is embedded in the original image information. Therefore, embedding of the watermark information does not have any adverse influence on the image quality. Any change in the original data can be sensitively recognized. The watermark information is difficult to be forged, and is easily applicable to data-compressed images.

Also according to the present invention, the quantized discrete cosine coefficients are divided into at least two data streams (for example, a first data stream and a second data stream), and the value of an AC component of the first data stream is set such that the value of the least significant bit of, for example, the sum of a plurality of data of the first data stream is in a prescribed relationship with (for example, is equal to), for example, the exclusive-OR of (i) the value of the watermark information, (ii) the value of the specific bit, and (iii) the value of the first pseudo random number. The value of an AC component of the second data stream is set such that the value of the least significant bit of, for example, the sum of a plurality of data of the second data stream is in a prescribed relationship with (for example, is equal to), for example, the exclusive-OR of (i) the value of the watermark information, (ii) the value of the specific bit, and (iii) the value of the second pseudo random number. Thus, the watermark information is embedded in the original image information. In this case, the above-mentioned effects of the present invention, i.e., (a) embedding of the watermark information does not have any adverse influence on the image quality; (b) any change in the original data can be sensitively recognized; and (c) the watermark information is difficult to be forged; and (d) the watermark information is easily applicable to data-compressed images are more surely guaranteed.

Thus, the invention described herein makes possible the advantages of providing an image processing apparatus, an image processing system, and an image processing method which allows difficult-to-forge watermark information to be embedded such that any change made in original data is sensitively recognized and which is applicable to data-compressed images; a control program for allowing a computer to execute the embedding and/or detection processing; a computer-readable recording medium having the control program stored thereon; and an electronic information apparatus using the same, for example, a digital camera.

These and other advantages of the present invention will become apparent to those skilled in the art upon reading and understanding the following detailed description with reference to the accompanying figures.

BRIEF DESCRIPTION OF THE DRAWINGS

FIG. 2A is a diagram illustrating a structure of a decompression/watermark information detection apparatus according to the first example of the present invention;

FIG. 2B is a diagram illustrating a structure of a watermark information detection apparatus according to the first example of the present invention;

FIG. 3A is a diagram illustrating a structure of a compression/watermark information embedding apparatus according to a second example of the present invention;

FIG. 3B is a diagram illustrating a structure of a watermark information embedding apparatus according to the second example of the present invention;

FIG. 7A is a diagram illustrating a structure of a compression/watermark information embedding apparatus according to a third example of the present invention;

FIG. 7B is a diagram illustrating a structure of a watermark information embedding apparatus according to the third example of the present invention;

FIG. 8A is a diagram illustrating a structure of a compression/watermark information embedding apparatus according to a fourth example of the present invention;

FIG. 8B is a diagram illustrating a structure of a watermark information embedding apparatus according to the fourth example of the present invention;

FIG. 9B is a diagram illustrating a structure of a watermark information embedding apparatus according to the fifth example of the present invention;

FIG. 10B is a diagram illustrating a structure of a watermark information embedding apparatus according to the fifth example of the present invention;

DESCRIPTION OF THE PREFERRED EMBODIMENTS

Hereinafter, the present invention will be described by way of illustrative, but non-limiting examples with reference to the accompanying drawings.

EXAMPLE 1

Figure 1A:
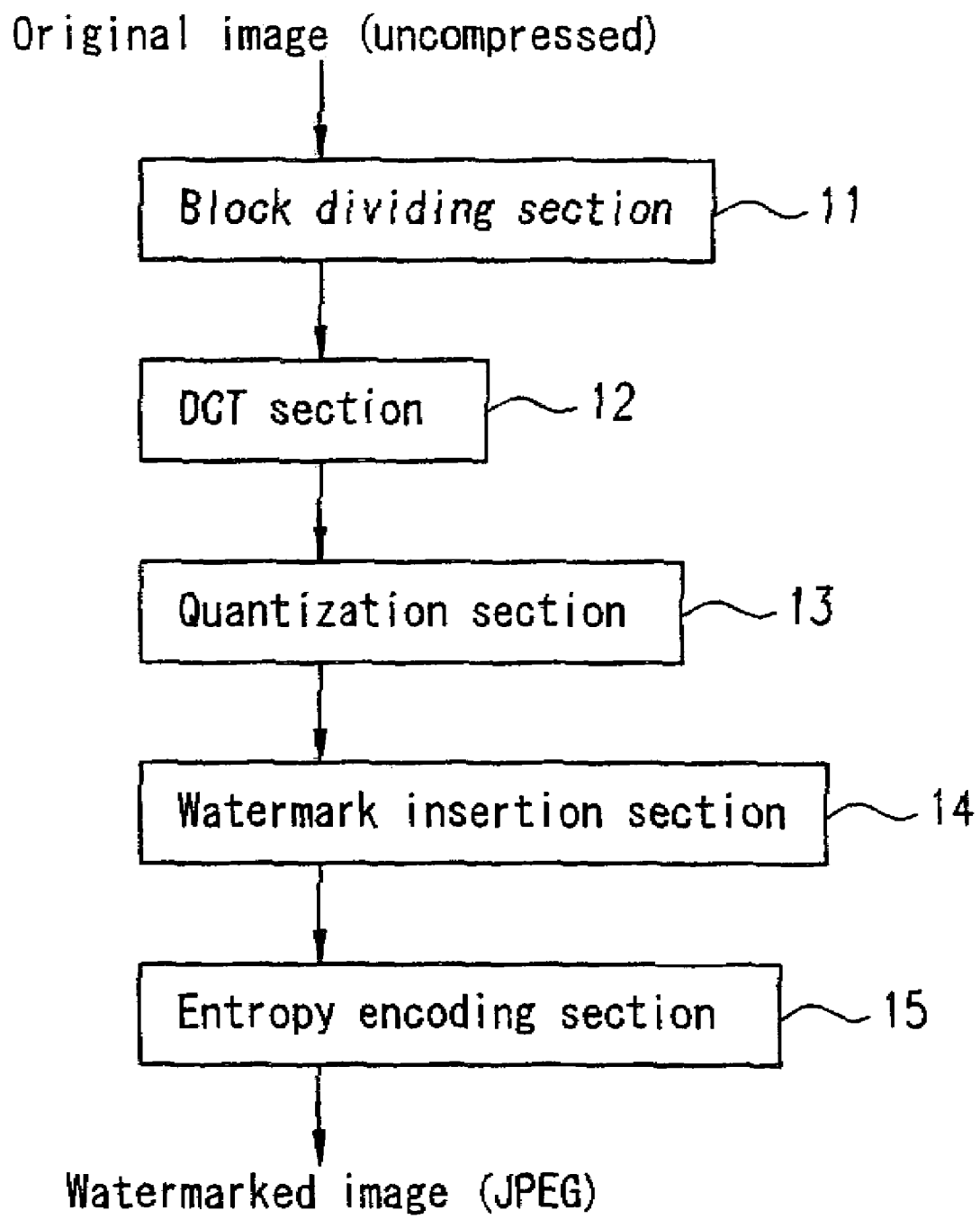
FIG. 1A is a diagram illustrating a structure of a compression/watermark information embedding apparatus according to a first example of the present invention.

FIG. 1A is a diagram illustrating a structure of a compression/watermark information embedding apparatus 1A according to a first example of the present invention.

As shown in FIG. 1A, the compression/watermark information embedding apparatus 1A includes a block dividing section 11 (image information dividing means), a DCT section 12 (discrete cosine transform means), a quantization section 13 (quantization means), a watermark insertion section 14 (watermark information embedding means), and an entropy encoding section 15 (data compression means).

The block dividing section 11 divides information of one original image into square blocks each having n×n pixels (for example, blocks each having 8×8 pixels), and extracts the information from each block.

The DCT section 12 performs DCTs (discrete cosine transforms), which is a type of data compression using intra-plane correlation (spatial frequency) for each block. DCT coefficients obtained by DCT (post-DCT coefficients) are arranged from a low frequency coefficient (DC) to a high frequency coefficient (AC).

The quantization section 13 performs quantization; i.e., divides the DCT coefficients obtained by DCT by a certain divisor Q (quantization step) and rounds the remainders. After the quantization, the data of an image is predominantly of a low frequency. Using this feature, the image can be compressed significantly. Table 1 shows one exemplary array of quantized DCT coefficients.

TABLE 1

Post-quantization DCT coefficients

| DC | AC0 | AC4 | AC5 | AC13 | AC14 | AC26 | AC27 |
|---|---|---|---|---|---|---|---|
| AC1 | AC3 | AC6 | AC12 | AC15 | AC25 | AC28 | AC41 |
| AC2 | AC7 | AC11 | AC16 | AC24 | AC29 | AC40 | AC42 |
| AC8 | AC10 | AC17 | AC23 | AC30 | AC39 | AC43 | AC52 |
| AC9 | AC18 | AC22 | AC31 | AC38 | AC44 | AC51 | AC53 |
| AC19 | AC21 | AC32 | AC37 | AC45 | AC50 | AC54 | AC59 |
| AC20 | AC33 | AC36 | AC46 | AC49 | AC55 | AC58 | AC60 |
| AC34 | AC35 | AC47 | AC48 | AC56 | AC57 | AC61 | AC62 |

The watermark insertion section 14 divides the quantized DCT coefficients into at least two data streams, and modifies values of AC components of the data streams. Thus, watermark information is embedded in each block of post-quantization image information with the DCT coefficients quantized. The above-mentioned modification is performed as follows.

First, the sum of a plurality of data of each data stream (or the sum of a plurality of data of a prescribed portion of each data stream), more specifically, the sum of a plurality of data, each including at least the value of its LSB, of each data stream (or the sum of a plurality of data, each including at least the value of its LSB, of a prescribed portion of each data stream), is divided by 2 (in the decimal system). Then, a value of an AC component of each data stream is modified such that the value of each remainder (the value of the LSB) resultant from the division has a prescribed relationship with the value of the watermark information (for example, the value of each remainder is equal to or different from the value of the watermark information). Specifically, the value of the first non-zero AC component, from the trailing end of each data stream, is processed by addition of 1 or subtraction of 1. In the case where each DCT coefficient (each of DC through AC62) has an 8-bit structure, the sum of a plurality of data, each including at least the value of its LSB, among each 8-bit structure may be used for the above-described division. Each of the plurality of data corresponds to one pixel.

The entropy encoding section 15 performs entropy encoding (variable-length encoding) on the image data resultant from quantization of the DCT coefficients and the subsequent embedding of the watermark information. Specifically, the entropy encoding is performed as follows. The entropy encoding section 15 assigns a short code length to values having a high probability of appearance, and assigns a long code length to values having a low probability of appearance. Namely, the non-uniformity in the probability of appearance is used to reduce the average amount of information. The data is compressed in this manner.

FIG. 2A is a diagram illustrating a structure of a decompression/watermark information detection apparatus 2A according to the first example of the present invention.

As shown in FIG. 2A, the decompression/watermark information detection apparatus 2A includes a block dividing section 21 (image information dividing means), an entropy decoding section 22 (data decompression means), and a watermark extraction section 23 (watermark information detection means).

The block dividing section 21 divides the image information having the watermark information embedded therein into square blocks each having n×n pixels (for example, blocks each having 8×8 pixels).

The entropy decoding section 22 performs entropy decoding on each block.

The watermark extraction section 23 divides the DCT coefficients obtained by the entropy decoding into at least two data streams, and detects the watermark information from each data stream as follows.

The sum of a plurality of data of each data stream (or the sum of a plurality of data of a prescribed portion of each data stream), more specifically, the sum of a plurality of data, each including at least the value of its LSB, of each data stream (or the sum of a plurality of data, each including at least the value of its LSB, of a prescribed portion of each data stream), is divided by 2 (in the decimal system). Depending on whether or not the remainders resultant from the division have a prescribed relationship with each other (for example, are equal to each other), the watermark extraction section 23 detects the watermark information from each data stream.

An exemplary operation of the compression/watermark information embedding apparatus 1A and the decompression/watermark information detection apparatus 2A according to the first example will be described in detail.

In the first example, a watermark information embedding method and a watermark information detection method which are both usable in a JPEG (Joint Photographic Experts Group) compression process are proposed. First, the watermark information embedding method will be described, with reference to FIG. 1A.

The block dividing section 11 divides an uncompressed original image into blocks each having 8×8 pixels.

The DCT section 12 performs DCTs on square image areas each having 8×8 pixels. Then, the quantization section 13 quantizes the resultant DCT coefficients by a Q table for JPEG.

The watermark insertion section 14 embeds watermark information in the quantized data.

The entropy encoding section 15 performs entropy encoding on the resultant data, and attaches a JPEG header to the resultant compressed data. Thus, a watermarked JPEG image is created. The watermarked JPEG image can be recognized and displayed on a screen like an ordinary JPEG image.

As described above, watermark information is inserted to each of the pixel blocks after the DCT coefficients are quantized but before the DCT coefficients are processed by entropy encoding. Therefore, the watermark information can be embedded in the image information such that any change in the original image data is sensitively recognized and the watermark information is difficult to forge, while exerting no adverse influence on the image quality.

The watermark information embedding processing, which is performed after the DCT coefficients are quantized but before the DCT coefficients are processed by entropy encoding, will be described in more detail.

First, watermark information is defined as in expression (1). Specifically, a binary image (log mac, etc.) and a character stream (ASCII code) are regarded as binary data usable as watermark information, and represented by expression (1).

$$W = \{w_0, w_1, \ldots, w_{l-1}\} \quad (1)$$

where $w_i (i=0, 1, \ldots, l-1)$ is 1-bit data.

Next, a method for embedding the watermark information after the DCT coefficients of the original image are quantized will be described.

1 bit of the watermark information is embedded in square blocks each having 8×8 pixels. This is performed after the DCT coefficients are quantized but before the DCT coefficients are entropy-encoded. Table 1 shows 64 quantized DCT coefficients. In Table 1, "DC" represents a direct current component, and "AC" represents an alternating current component. The serial numbers following "AC", i.e., 0 through 62 represent the order in which the components are entropy-encoded.

In this example, these 64 DCT coefficients shown in Table 1 are divided into two groups. The DCT coefficients in one group are shaded (group 1), and the DCT coefficients in the other group are not shaded (group 2) in Table 1. Expression (2) represents the data of group 1, and expression (3) represents the data of group 2.

$$S1 = \{DC, AC0, AC4, AC5, AC6, AC11, AC12, AC13, \quad (2)$$
$$AC14, AC15, AC16, AC24, AC25, AC26, AC27, AC28,$$
$$AC29, AC30, AC38, AC39, AC40, AC41, AC42, AC43,$$
$$AC44, AC51, AC52, AC53, AC54, AC58, AC59, AC60\}$$
$$= \{s_{100}, s_{101}, s_{102}, \ldots, s_{131}\}$$

$$S2 = \{AC1, AC2, AC3, AC7, AC8, AC9, AC10, AC17, \quad (3)$$
$$AC18, AC19, AC20, AC21, AC22, AC23, AC31, AC32,$$
$$AC33, AC34, AC35, AC36, AC37, AC45, AC46, AC47,$$
$$AC48, AC49, AC50, AC55, AC56, AC57, AC61, AC62\}$$
$$= \{s_{200}, s_{201}, s_{202}, \ldots, s_{231}\}$$

The 64 DCT coefficients may be divided into two groups as shown in Table 2.

TABLE 2

Post-quantization DCT coefficients

| DC | AC0 | AC4 | AC5 | AC13 | AC14 | AC26 | AC27 |
|---|---|---|---|---|---|---|---|
| AC1 | AC3 | AC6 | AC12 | AC15 | AC25 | AC28 | AC41 |
| AC2 | AC7 | AC11 | AC16 | AC24 | AC29 | AC40 | AC42 |
| AC8 | AC10 | AC17 | AC23 | AC30 | AC39 | AC43 | AC52 |
| AC9 | AC18 | AC22 | AC31 | AC38 | AC44 | AC51 | AC53 |
| AC19 | AC21 | AC32 | AC37 | AC45 | AC50 | AC54 | AC59 |
| AC20 | AC33 | AC36 | AC46 | AC49 | AC55 | AC58 | AC60 |
| AC34 | AC35 | AC47 | AC48 | AC56 | AC57 | AC61 | AC62 |

The 64 DCT coefficients may be divided into three or more groups, instead of two groups. It is not absolutely necessary that all the groups have the same number of DCT coefficients. Nor is it necessary that the groups are positioned symmetrically. In this example, the two groups have the same number of DCT coefficients and are symmetrically positioned. The DCT coefficients need to be divided into at least two groups in order to extract (detect) the watermark information later.

Watermark information $w_j$ is embedded in the original image data having 8×8 pixels using expressions (4a) and (4b). Specifically, the first non-zero DCT coefficient, from the trailing end of each of data streams S1 and S2, is modified (i.e., processed by addition of 1 or subtraction of 1). Thus, the watermark information is embedded in the image information.

$$\left(\sum_{i=00}^{31} s_{1i}\right) \%2 = w_j \quad (4a)$$

$$\left(\sum_{i=00}^{31} s_{2i}\right) \%2 = w_j \quad (4b)$$

The left side of expression (4a) shows the remainder (the value of the LSB) obtained when the sum of a plurality of data of the data stream of expression (2) is divided by 2 (in the decimal system). The left side of expression (4b) shows the remainder (the value of the LSB) obtained when the sum of a plurality of data of the data stream of expression (3) is divided by 2 (in the decimal system). In this example, the sum of a plurality of data of each data stream is used. Either the sum of a plurality of data of each data stream, or the sum of a plurality of data of a prescribed portion of each data stream, is usable as long as the values of the LSBs are included.

The right side of each of expressions (4a) and (4b) represents watermark information $w_j$ represented by expression (1).

Next, watermark information extraction and authentication of an original image will be described.

The watermark information is extracted as follows. A watermarked JPEG image is divided into square blocks each having 8×8 pixels, and the blocks are processed by entropy decoding. Then, the watermark information is extracted from each block.

Specifically, the block dividing section 21 divides the watermarked JPEG image into square blocks each having 8×8 pixels. The entropy decoding section 22 performs entropy decoding on each block. 64 DCT coefficients resultant from the entropy decoding are divided into two data streams as shown in, for example, Table 1.

Then, $w_{j1}$ and $w_{j2}$ are found by expressions (10a) and (10b).

$$w_{j1} = \left(\left(\sum_{i=00}^{31} S_{1i}\right) \%2\right) \quad (10a)$$

$$w_{j2} = \left(\left(\sum_{i=00}^{31} S_{2i}\right) \%2\right) \quad (10b)$$

The right side of expression (10a) represents the remainder (the value of the LSB) obtained when the sum of a plurality of data of one of the data streams is divided by 2 (in the decimal system). The right side of expression (10b) represents the remainder (the value of the LSB) obtained when the sum of a plurality of data of the other data stream is divided by 2 (in the decimal system). In this example, the sum of a plurality of data of each data stream is used. Either the sum of a plurality of data of each data stream, or the sum of a plurality of data of a prescribed portion of each data stream, is usable as long as the values of the LSBs are included.

In the case where $w_{j1}=w_{j2}$ (i.e., the value of the right side of expression (10a)=the value of the right side of expression (10b)), such a value is the value of the watermark information. Otherwise, the data in this block has been changed. In this manner, it can be easily found whether the data has been changed or not.

In this example, when the watermark information is embedded in the image information, the values of the AC components of the two data streams are set such that the value of the LSB of the sum of a plurality of data of each data stream is equal to the value of the watermark information. Alternatively, the values of the AC components of the two data streams may be set such that the value of the LSB of the sum of a plurality of data of each data stream is different from the value of the watermark information. Still alternatively, the values of the AC components of the two data streams may be set such that the value of the LSB of the sum of a plurality of data of one of the data streams is different from the value of the watermark information, and the value of the LSB of the sum of a plurality of data of the other data stream is equal to the value of the watermark information. In these cases, the value of the watermark information needs to be detected after performing calculations appropriate for the prescribed relationship.

The compression/watermark information embedding apparatus 1A and the decompression/watermark information detection apparatus 2A may be separate from each other, or integrated together as one image processing apparatus (image processing system). Alternatively, the compression/watermark information embedding apparatus 1A and the decompression/watermark information detection apparatus 2A may be connected by a communication device or the like in a wired or wireless manner so as to form an image processing system.

Figure 1B:
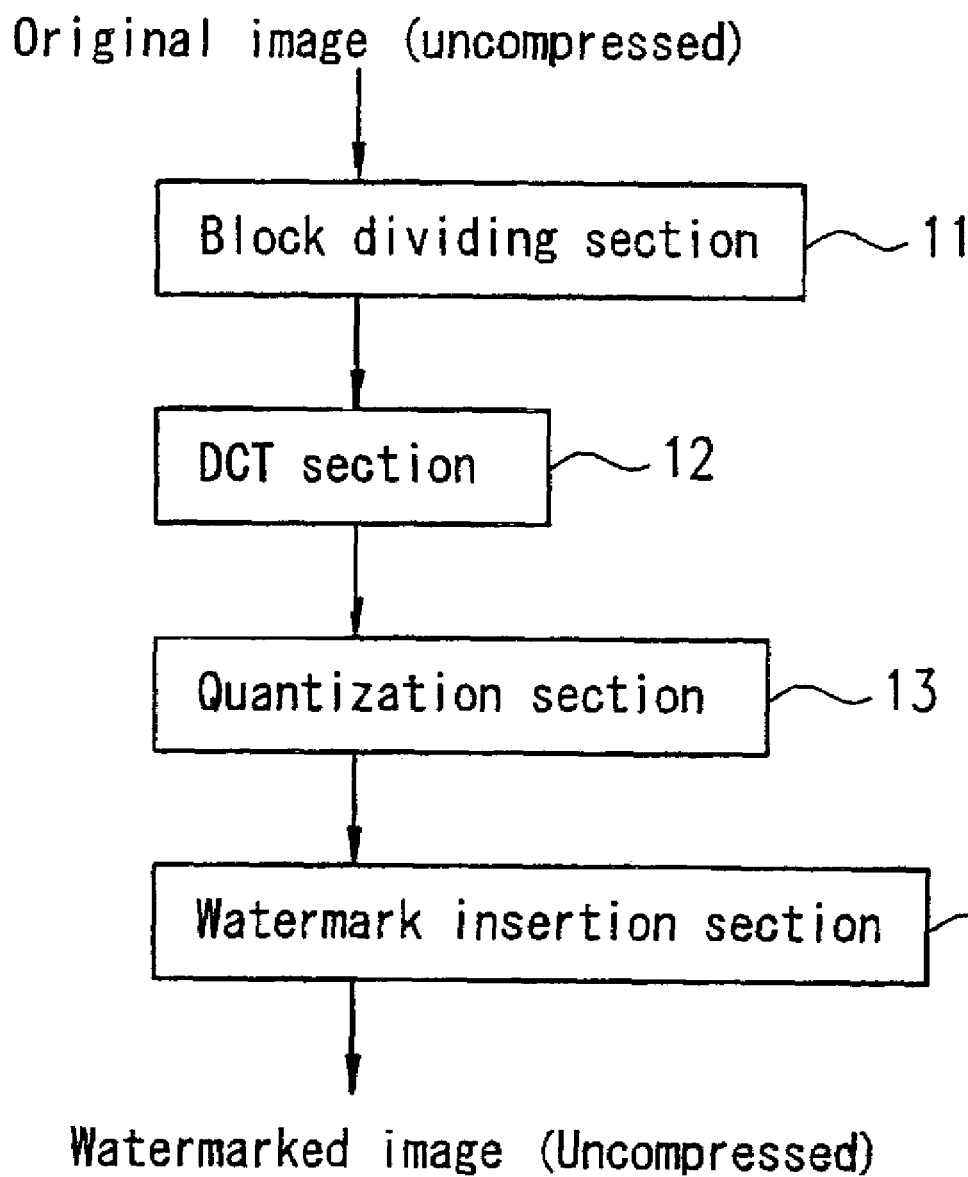
FIG. 1B is a diagram illustrating a structure of a watermark information embedding apparatus according to the first example of the present invention.

In this example, the compression/watermark information embedding apparatus 1A (FIG. 1A) encodes the data by the entropy encoding section 15 after the watermark information is embedded, and the decompression/watermark information detection apparatus 2A (FIG. 2A) detects the watermark information using the data obtained by decoding the data of each of the divided blocks by the entropy decoding section 22. The present invention is not limited to this. The present invention is applicable to a watermark information embedding apparatus 1B (FIG. 1B) which does not compress the data, i.e., does not encode the data after the watermark information is embedded. In this case, a watermark information detection apparatus 2B (FIG. 2B) detects the watermark information without decoding the data of each of the divided blocks.

EXAMPLE 2

FIG. 3A is a diagram illustrating a structure of a compression/watermark information embedding apparatus 3A according to a second example of the present invention.

As shown in FIG. 3A, the compression/watermark information embedding apparatus 3A includes a block dividing section 31 (image information dividing means), a DCT section 32 (discrete cosine transform means), a quantization section 33 (quantization means), a pseudo random number generation section 34 (pseudo random number generation means), a specific bit extraction section 35 (specific bit extraction means), a watermark insertion section 36 (watermark information embedding means), and an entropy encoding section 37 (data compression means).

The block dividing section 31 divides information of an original image into square blocks each having n×n pixels (for example, blocks each having 8×8 pixels), and extracts the information from each block.

The DCT section 32 performs a DCT for each block.

The quantization section 33 quantizes DCT coefficients obtained by DCT on a block-by-block basis.

The pseudo random number generation section 34 generates a first pseudo random number and a second pseudo random number. The values of the first and second pseudo random numbers maybe equal to or different from each other.

The specific bit extraction section 35 extracts a specific bit from a DC component of the quantized DCT coefficients.

The watermark insertion section 36 divides the quantized DCT coefficients into at least two data streams (e.g., a first data stream and a second data stream), and modifies values of AC components of the data streams. Thus, watermark information is embedded in each block of post-quantization image information with the DCT coefficients quantized. The above-mentioned modification is performed as follows.

First, the sum of a plurality of data of the first data stream (or the sum of a plurality of data of a prescribed portion of the first data stream), more specifically, the sum of a plurality of data, each including at least the value of its LSB, of the first data stream (or the sum of a plurality of data, each including at least the value of its LSB, of a prescribed portion of the first data stream), is divided by 2 (in the decimal system). Then, a value of an AC component of the first data stream is modified such that the value of the remainder (the value of the LSB) resultant from the division has a prescribed relationship with (e.g., is equal to) the exclusive-OR (or the exclusive-NOR) of (i) the value of the watermark information, (ii) the value of the specific bit, and (iii) the value of the first pseudo random number. Similarly, the sum of a plurality of data of the second data stream (or the sum of a plurality of data of a prescribed portion of the second data stream), more specifically, the sum of a plurality of data, each including at least the value of its LSB, of the second data stream (or the sum of a plurality of data, each including at least the value of its LSB, of a prescribed portion of the second data stream), is divided by 2 (in the decimal system). A value of an AC component of the second data stream is modified such that the value of the remainder (the value of the LSB) resultant from the division has a prescribed relationship with (e.g., is equal to) the exclusive-OR (or the exclusive-NOR) of (i) the value of the watermark information, (ii) the value of the specific bit, and (iii) the value of the second pseudo random number.

Specifically, the value of the first non-zero AC component, from the trailing end of the first data stream, is processed by addition of 1 or subtraction of 1. Similarly, the value of the first non-zero AC component, from the trailing end of the second data stream, is processed by addition of 1 or subtraction of 1.

The entropy encoding section 37 performs entropy encoding on the image data resultant from quantization of the DCT coefficients and the subsequent embedding of the watermark information.

Figure 4A:
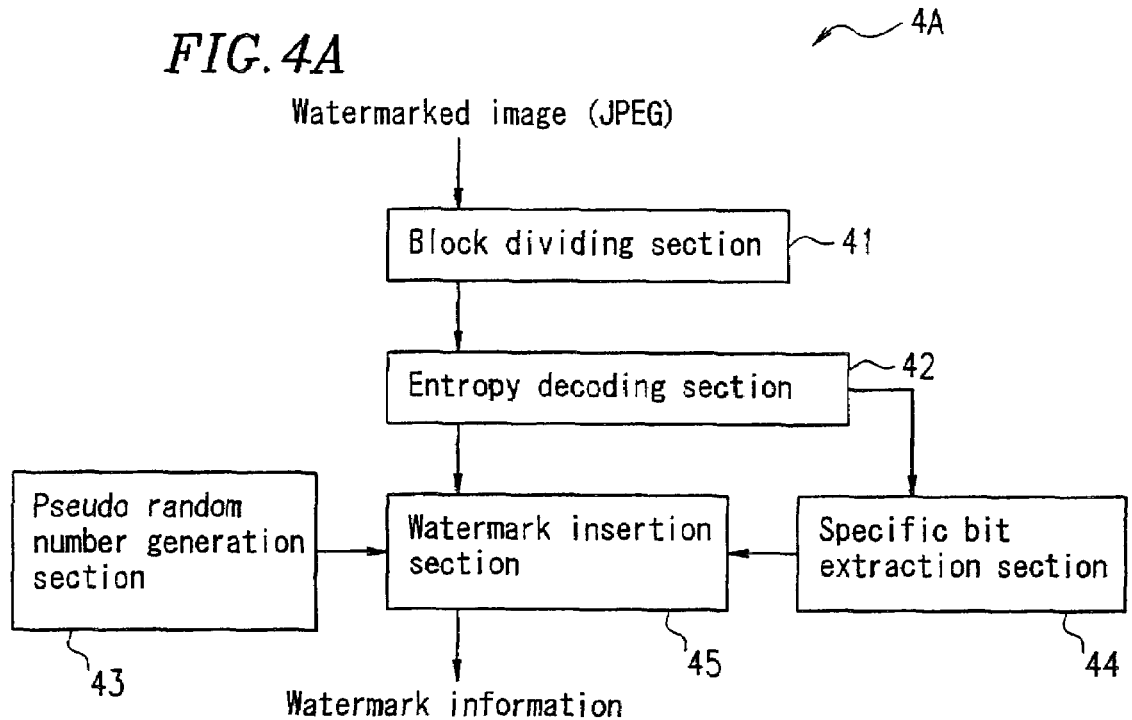
FIG. 4A is a diagram illustrating a structure of a decompression/watermark information detection apparatus according to the second example of the present invention.

FIG. 4A is a diagram illustrating a structure of a decompression/watermark information detection apparatus 4A according to the second example of the present invention.

As shown in FIG. 4A, the decompression/watermark information detection apparatus 4A includes a block dividing section 41 (image information dividing means), an entropy decoding section 42 (data decompression means), a pseudo random number generation section 43 (pseudo random number generation means), a specific bit extraction section 44 (specific bit extraction means), and a watermark extraction section 45 (watermark information detection means).

The block dividing section 41 divides the image information having the watermark information embedded therein into square blocks each having n×n pixels (for example, blocks each having 8×8 pixels).

The entropy decoding section 42 performs entropy decoding on each block so as to decompress the image data.

The pseudo random number generation section 43 generates a first pseudo random number and a second pseudo random number. In the case where the values of the first and second pseudo random numbers generated by the pseudo random number generation section 34 in the compression/watermark information embedding apparatus 3A are equal to each other, the values of the first and second pseudo random numbers generated by the pseudo random number generation section 43 in the decompression/watermark information detection apparatus 4A are also equal to each other. In the case where the values of the first and second pseudo random numbers generated by the pseudo random number generation section 34 are different from each other, the values of the first and second pseudo random numbers generated by the pseudo random number generation section 43 are also different from each other.

The specific bit extraction section 44 extracts a specific bit from a DC component of the quantized DCT coefficients.

The watermark extraction section 45 divides the DCT coefficients obtained by the entropy decoding into at least two data streams (e.g., a first data stream and a second data stream), and detects the watermark information from each data stream as follows.

First, the sum of a plurality of data of the first data stream (or the sum of a plurality of data of a prescribed portion of the first data stream), more specifically, the sum of a plurality of data, each including at least the value of its LSB, of the first data stream (or the sum of a plurality of data, each including at least the value of its LSB, of a prescribed portion of the first data stream), is divided by 2 (in the decimal system). The sum of a plurality of data of the second data stream (or the sum of a plurality of data of a prescribed portion of the second data stream), more specifically, the sum of a plurality of data, each including at least the value of its LSB, of the second data stream (or the sum a plurality of data, each including at least the value of its LSB, of a prescribed portion of the second data stream), is divided by 2 (in the decimal system). Then, the exclusive-OR (or the exclusive-NOR) of (i) the remainder of the division (the value of the LSB) performed on the first data stream, (ii) the value of the specific bit, and (iii) the value of the first pseudo random number is obtained. Similarly, the exclusive-OR (or the exclusive-NOR) of (i) the remainder of the division (the value of the LSB) performed on the second data stream, (ii) the value of the specific bit, and (iii) the value of the second pseudo random number is obtained. Depending on whether or not the exclusive-ORs have a prescribed relationship with each other (for example, are equal to each other), the watermark extraction section 45 detects the watermark information from each data stream.

An exemplary operation of the compression/watermark information embedding apparatus 3A and the decompression/watermark information detection apparatus 4A according to the second example will be described in detail.

Figure 5:
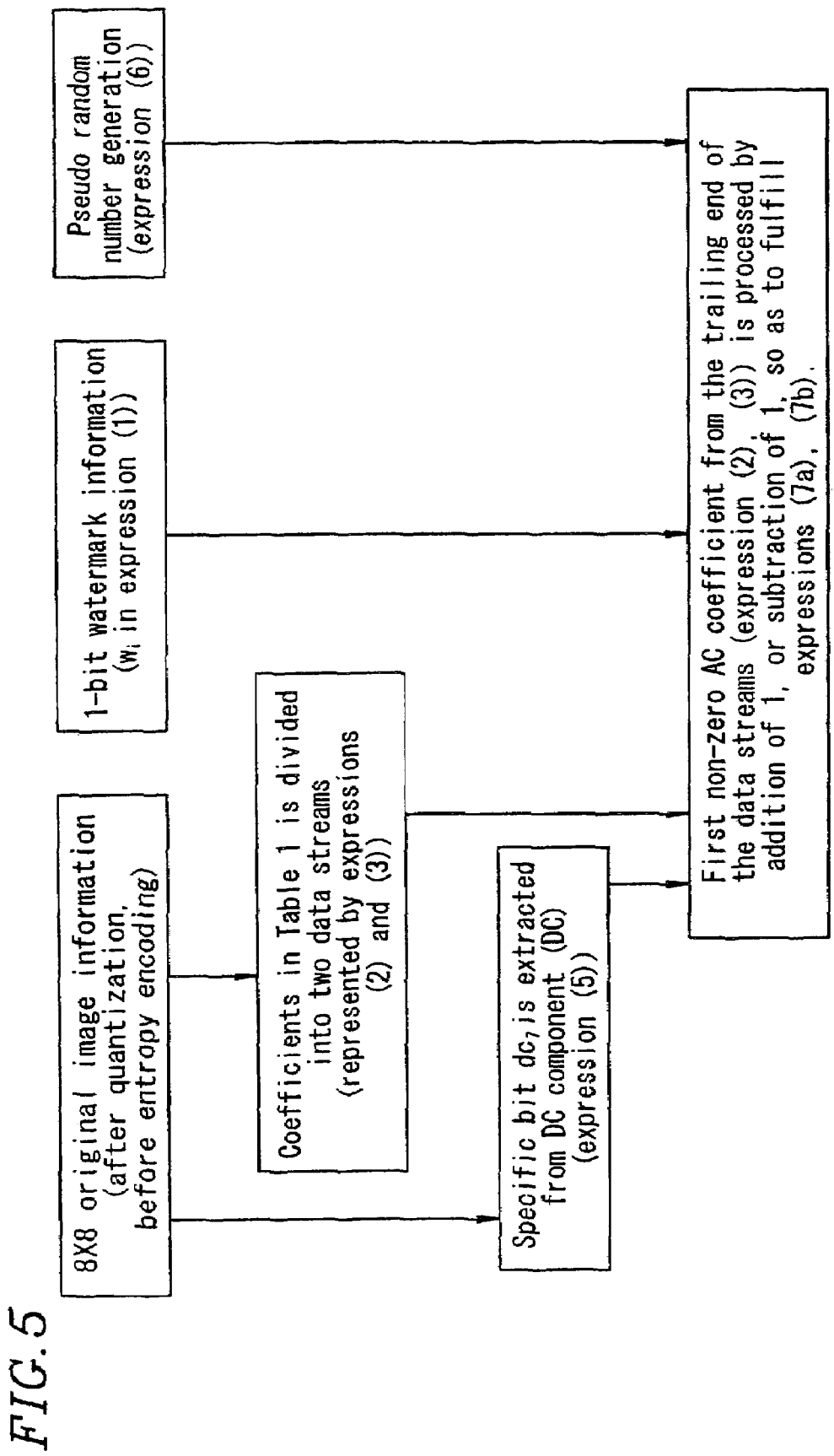
FIG. 5 is a flowchart illustrating a watermark insertion operation shown in FIG. 3A.

In the watermark information embedding processing according to the first example, only the AC components of the DCT coefficients showing a high frequency are adjusted. More preferably, according to the second example, the DC components of the quantized DCT coefficients are directly used for embedding the watermark information. FIG. 5 shows the details of such watermark insertion processing.

A DC component (DC) of the quantized DCT coefficients is represented by expression (5).

$$DC = \sum_{i=0}^{7} 2^i dc_i \tag{5}$$

where $dc_i$ (i=0, 1, . . . , 7) is 1-bit data. In the following example, specific bit $dc_7$ Of the DC component of the quantized DCT coefficients is used for embedding the watermark information. Other specific bits may be used.

In order to enhance the security function, pseudo random numbers are used.

A pseudo random number is represented by expression (6).

$$R = \{r_0, r_1, \ldots, r_{2l-1}\} \tag{6}$$

where
$r_i$(i=0, 1, . . . , 2l-1)
is a 1-bit pseudo random number.

The final watermarking algorithm is represented by expressions (7a) and (7b).

$$\left(\sum_{i=00}^{31} S_{1i}\right) \%2 \oplus dc_7 \oplus r_{2j} = w_j \tag{7a}$$

$$\left(\sum_{i=00}^{31} S_{2i}\right) \%2 \oplus dc_7 \oplus r_{2j+1} = w_j \tag{7b}$$

The first non-zero DCT coefficient, from the trailing end of each of data streams S1 and S2, is modified (i.e., processed by addition of 1 or subtraction of 1) so as to fulfill expressions (7a) and (7b). Thus, the watermark information is embedded in the image information.

The left side of expression (7a) represents the exclusive-OR of (i) the remainder (the value of the LSB) obtained when the sum a plurality of data of the data stream of expression (2) is divided by 2 (in the decimal system), (ii) the value of specific bit $dc_7$ Of the DC component of the quantized DCT coefficients, and (iii) the value of pseudo random number $r_{2j}$. In this example, the sum a plurality of data of the data stream is used. Either the sum of a plurality of data of each data stream, or the sum of a plurality of data of a prescribed portion of each data stream, is usable as long as the values of the LSBs are included.

An exclusive-OR of three inputs (A, B and C) is obtained by, first, obtaining the exclusive-OR of A and B (or (A and C) or (B and C)) and then, obtaining the exclusive-OR of the resultant exclusive-OR and the remaining input (C, B or A). Thus, the above-mentioned exclusive-OR of (i) the remainder (the value of the LSB) obtained by the division performed regarding expression (2), (ii) the value of specific bit $dc_7$ of the DC component of the quantized DCT coefficients, and (iii) the value of pseudo random number $r_{2j}$ is obtained as follows. First, two of values (i), (ii) and (iii) are selected, and the exclusive-OR of the two is obtained. Then, the exclusive-OR of the obtained exclusive-OR and the remaining value is found. An exclusive-OR is 0 (L level) when the two input values are the same, and is 1 (H level) when the two input values are different.

The left side of expression (7b) represents the exclusive-OR of (i) the remainder (the value of the LSB) obtained when the sum of a plurality of data of the data stream of expression (3) is divided by 2 (in the decimal system), (ii) the value of specific bit $dc_7$ of the DC component of the quantized DCT coefficients, and (iii) the value of pseudo random number $r_{2j+1}$. In this example, the sum of a plurality of data of the data stream is used. Either the sum of a plurality of data of each data stream, or the sum of a plurality of data of a prescribed portion of each data stream, is usable as long as the values of the LSBs are included.

The above-mentioned exclusive-OR of (i) the remainder (the value of the LSB) obtained by the division performed regarding expression (3), (ii) the value of specific bit $dc_7$ of the DC component of the quantized DCT coefficients, and (iii) the value of pseudo random number $r_{2j+1}$ is obtained as follows. First, two of values (i), (ii) and (iii) are selected, and the exclusive-OR of the two is obtained. Then, the exclusive-OR of the obtained exclusive-OR and the remaining value is found. An exclusive-OR is 0 (L level) when the two input values are the same, and is 1 (H level) when the two input values are different.

The right side of each of expressions (7a) and (7b) represents watermark information $w_j$ represented by expression (1).

Expressions (7a) and (7b) can be rewritten as expressions (8a) and (8b). Either expressions (7a) and (7b), or expressions (8a) and (8b), may be selected for the convenience of calculations. In the case where expressions (8a) and (8b) are used also, the watermark information is embedded in the image information on a block-by-block basis by modifying the first non-zero DCT coefficient, from the trailing end of each of data streams S1 and S2 (i.e., processing the first non-zero DCT coefficient with addition of 1 or subtraction of 1).

$$\left(\sum_{i=00}^{31} S_{1i}\right) \%2 = w_j \oplus dc_7 \oplus r_{2j} \quad (8a)$$

$$\left(\sum_{i=00}^{31} S_{2i}\right) \%2 = w_j \oplus dc_7 \oplus r_{2j+1} \quad (8b)$$

The left side of expression (8a) represents the remainder (the value of the LSB) obtained when the sum of a plurality of data of the data stream of expression (2) is divided by 2 (in the decimal system). The left side of expression (8b) represents the remainder (the value of the LSB) obtained when the sum of a plurality of data of the data stream of expression (3) is divided by 2 (in the decimal system).

The right side of expression (8a) represents the exclusive-OR of (i) watermark information $w_j$ represented by expression (1), (ii) the value of the specific bit $dc_7$ of the DC component of the quantized DCT coefficients, and (iii) the value of pseudo random number $r_{2j}$. The above-mentioned exclusive-OR of (i) watermark information $w_j$, (ii) the value of specific bit $dc_7$ of the DC component of the quantized DCT coefficients, and (iii) the value of pseudo random number $r_{2j}$ is obtained as follows. First, the exclusive-OR of the watermark information $w_j$ and the value of the specific bit $dc_7$ of the DC component of the quantized DCT coefficients (or, the watermark information $w_j$ and the value of pseudo random number $r_{2j}$, or, the value of specific bit $dc_7$ of the DC component of the quantized DCT coefficients and the value of pseudo random number $r_{2j}$) is obtained. Then, the exclusive-OR of the obtained exclusive-OR and the remaining value (the value of pseudo random number $r_{2j}$, the value of specific bit $dc_7$ of the DC component of the quantized DCT coefficients, or the watermark information $w_j$) is found.

The right side of expression (8b) represents the exclusive-OR of (i) watermark information $w_j$ represented by expression (1), (ii) the value of specific bit $dc_7$ of the DC component of the quantized DCT coefficients, and (iii) the value of pseudo random number $r_{2j+1}$. The above-mentioned exclusive-OR of (i) watermark information $w_j$, (ii) the value of specific bit $dc_7$ of the DC component of the quantized DCT coefficients, and (iii) the value of pseudo random number $r_{2j+1}$ is obtained as follows. First, the exclusive-OR of the watermark information $w_j$ and the value of specific bit $dc_7$ of the DC component of the quantized DCT coefficients (or, the watermark information $w_j$ and the value of pseudo random number $r_{2j+1}$, or, the value of specific bit $dc_7$ of the DC component of the quantized DCT coefficients and the value of pseudo random number $r_{2j+1}$) is obtained. Then, the exclusive-OR of the obtained exclusive-OR and the remaining value (the value of pseudo random number $r_{2j+1}$, the value of specific bit $dc_7$ of the DC component of the quantized DCT coefficients, or the watermark information $w_j$) is found.

Next, watermark information extraction and authentication of an original image will be described.

Figure 6:
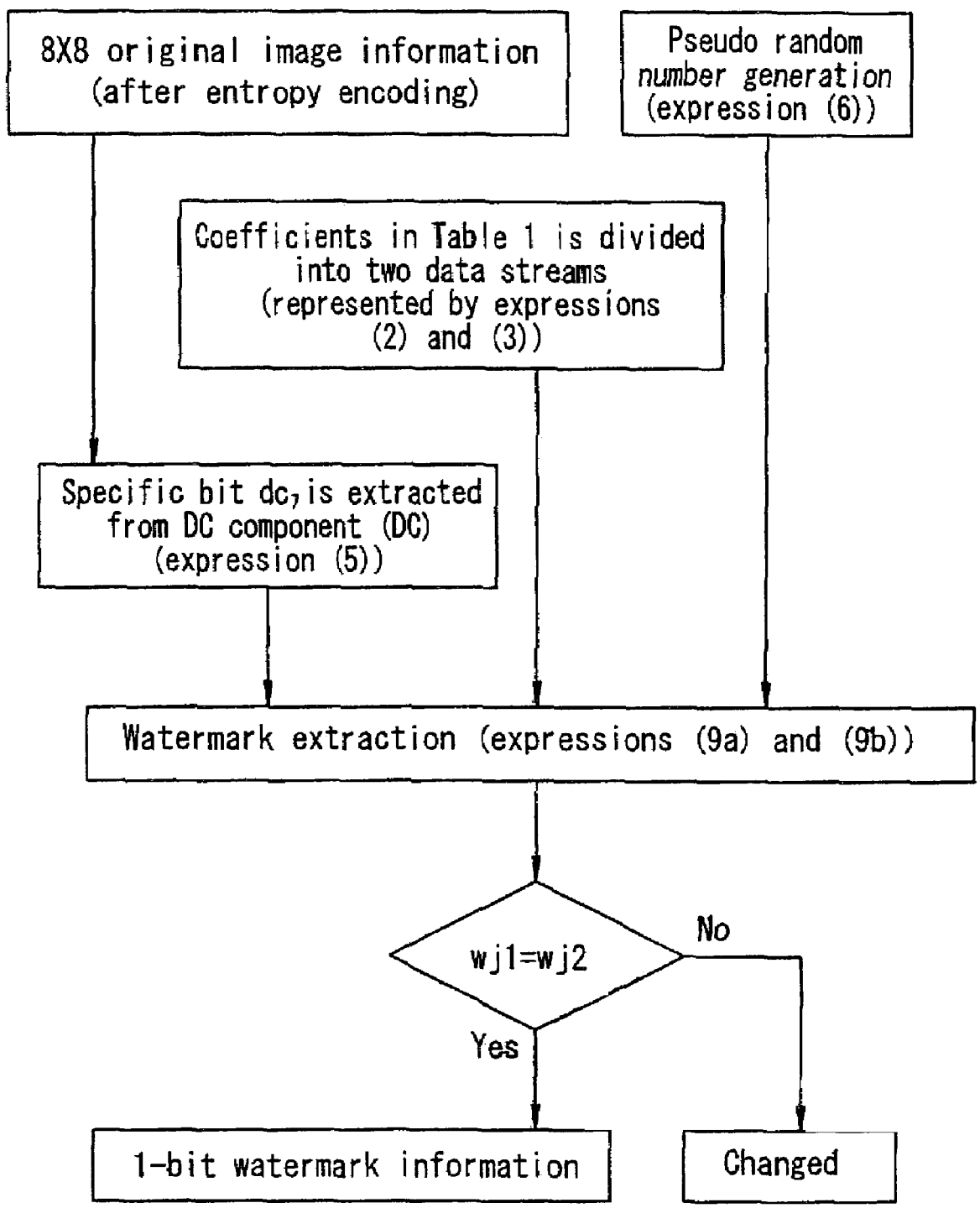
FIG. 6 is a flowchart illustrating a watermark detection operation shown in FIG. 4A.

The watermark information is extracted as follows. A watermarked JPEG image is divided into square blocks each having 8×8 pixels, and the blocks are processed by entropy decoding. From a pseudo random number type (used as a password), a random number sequence R is generated. From a DC component DC, a specific bit $dc_7$ is extracted. The 64 DCT coefficients resultant from the entropy decoding are divided into two data streams (see Table 1). Then, $w_{j1}$ and $w_{j2}$ are found by expressions (9a) and (9b). The details of the watermark information extraction is shown in FIG. 6.

$$w_{j1} = \left( \left( \sum_{i=00}^{31} S_{1i} \right) \%2 \right) \oplus r_j \oplus dc_7 \quad (9a)$$

$$w_{j2} = \left( \left( \sum_{i=00}^{31} S_{2i} \right) \%2 \right) \oplus r_{2j+1} \oplus dc_7 \quad (9b)$$

The right side of expression (9a) represents the exclusive-OR of (i) the remainder (the value of the LSB) obtained when the sum of a plurality of data of one of the data streams is divided by 2 (in the decimal system), (ii) the value of specific bit $dc_7$ of the DC component resultant from the entropy decoding, and (iii) the value of pseudo random number $r_{2j}$. In this example, the sum of a plurality of data of the data stream is used. Either the sum of a plurality of data of each data stream, or the sum of a plurality of data of a prescribed portion of each data stream, is usable depending on the conditions for watermark information embedding, as long as the values of the LSBs are included.

The right side of expression (9b) represents the exclusive-OR of (i) the remainder (the value of the LSB) obtained when the sum of a plurality of data of the other data stream is divided by 2 (in the decimal system), (ii) the value of specific bit $dc_7$ of the DC component resultant from the entropy decoding, and (iii) the value of pseudo random number $r_{2j+1}$. In this example, the sum of a plurality of data of the data stream is used. Either the sum of a plurality of data of each data stream, or the sum of a plurality of data of a prescribed portion of each data stream, is usable depending on the conditions for watermark information embedding, as long as the values of the LSBs are included.

In the case where $w_{j1}=w_{j2}$ (i.e., the value of the right side of expression (9a)=the value of the right side of expression (9b)), such a value is the value of the watermark information. Otherwise, the data in this block has been changed. In this manner, it can be easily found whether the data has been changed or not.

In this example, when the watermark information is embedded in the image information, the value of the AC component of one of the two data streams (e.g., a first data stream) is set such that the value of the LSB of the sum of a plurality of data of the first data stream is equal to the value of the exclusive-OR of (i) the value of the watermark information, (ii) the value of the specific bit, and (iii) the value of the first pseudo random number. The value of the AC component of the other data stream (e.g., a second data stream) is set such that the value of the LSB of the sum of a plurality of data of the second data stream is equal to the value of the exclusive-OR of (i) the value of the watermark information, (ii) the value of the specific bit, and (iii) the value of the second pseudo random number.

Alternatively, the watermark information may be embedded in the image information as follows. The value of the AC component of one of the two data streams (e.g., a first data stream) is set such that the value of the LSB of the sum of a plurality of data of the first data stream is different from the value of the exclusive-OR of (i) the value of the watermark information, (ii) the value of the specific bit, and (iii) the value of the first pseudo random number. The value of the AC component of the other data stream (e.g., a second data stream) is set such that the value of the LSB of the sum of a plurality of data of the second data stream is different from the value of the exclusive-OR of (i) the value of the watermark information, (ii) the value of the specific bit, and (iii) the value of the second pseudo random number. In such a case, the value of the watermark information needs to be detected after performing calculations appropriate for the prescribed relationship.

The compression/watermark information embedding apparatus 3A and the decompression/watermark information detection apparatus 4A may be separate from each other, or integrated together as one image processing apparatus (image processing system). Alternatively, the compression/watermark information embedding apparatus 3A and the decompression/watermark information detection apparatus 4A may be connected by a communication device or the like in a wired or wireless manner so as to form an image processing system.

In this example, the exclusive-OR (EXOR) of the above-mentioned values is used. Alternatively, the exclusive-NOR may be used. The purpose is to find only a block with its data changed in the image information. An exclusive-NOR (EX-NOR; negative of EXOR) is obtained as follows. First, two out of three values are selected, and the exclusive-NOR of the two is obtained. Then, the exclusive-NOR of the obtained exclusive-NOR and the remaining value is found. An exclusive-NOR is 1 (H level) when the two input values are the same, and is 0 (L level) when the two input values are different.

In this example, as described above, an exclusive-OR is defined as being obtained as follows from three inputs: i.e., the value of the watermark information, the value of the specific bit, and the value of the pseudo random number. First, the exclusive-OR of two out of the three inputs is obtained, and then the exclusive-OR of the obtained exclusive-OR and the remaining value is obtained. An exclusive-NOR is defined as being obtained as follows from the above-mentioned three inputs. First, a negative value of the exclusive-OR of two out of the three inputs is obtained, and then a negative of the exclusive-OR of the obtained negative value and the remaining value is obtained.

Alternatively, an exclusive-OR and an exclusive-NOR may be defined differently. For example, an exclusive-OR may be defined as an value which is 0 (L level) when the three inputs (the value of the watermark information, the value of the specific bit, and the value of the pseudo random number) are the same, and is 1 (H level) otherwise. An exclusive-NOR may be defined as an value which is 1 (H level) when the three inputs are the same, and is 0 (L level) otherwise.

Figure 4B:
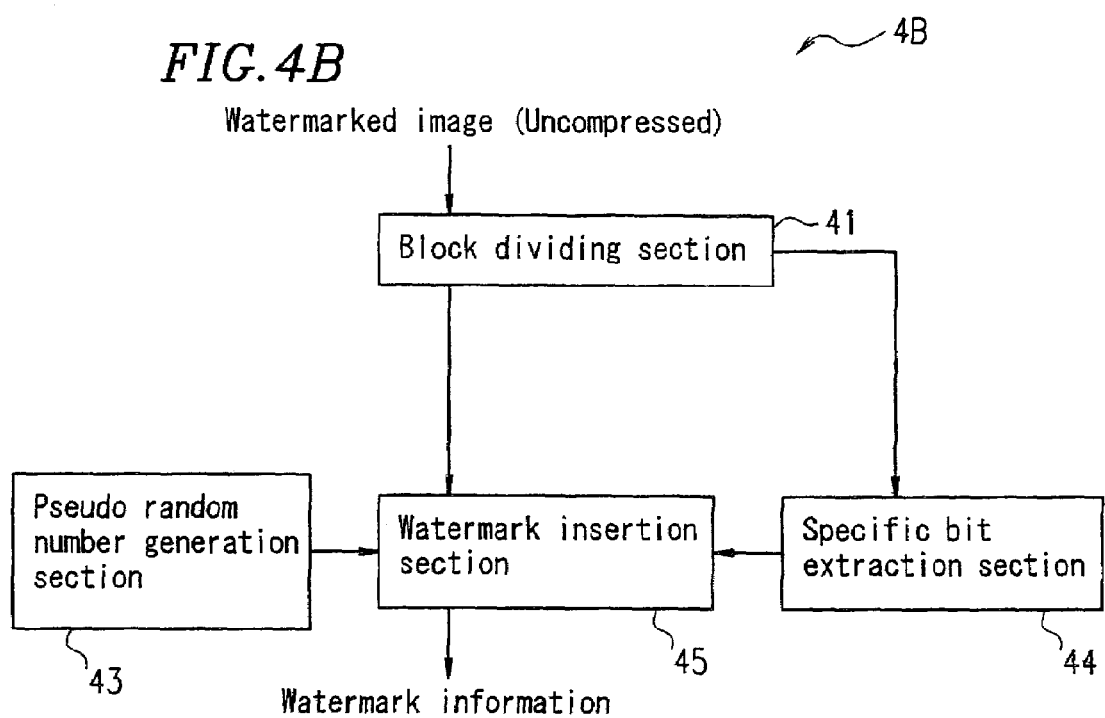
FIG. 4B is a diagram illustrating a structure of a watermark information detection apparatus according to the second example of the present invention.

In this example, the compression/watermark information embedding apparatus 3A (FIG. 3A) encodes the data by the entropy encoding section 37 after the watermark information is embedded, and the decompression/watermark information detection apparatus 4A (FIG. 4A) detects the watermark information using the data obtained by decoding the data of each of the divided blocks by the entropy decoding section 42. The present invention is not limited to this. The present invention is applicable to a watermark information embedding apparatus 3B (FIG. 3B) which does not compress the data, i.e., does not encode the data after the watermark information is embedded. In this case, a watermark information detection apparatus 4B (FIG. 4B) detects the watermark information without decoding the data of each of the divided blocks.

EXAMPLE 3

In the first example, prescribed watermark information is detectably embedded in an original image photographed by, for example, a digital camera. According to a third example of the present invention, prescribed watermark information is detectably embedded in data-compressed image information (e.g., JPEG image information) which is to be communicated or stored.

FIG. 7A is a diagram illustrating a structure of a compression/watermark information embedding apparatus 5A according to a third example of the present invention. Identical elements previously discussed with respect to FIG. 1A bear identical reference numerals and the detailed descriptions thereof will be omitted.

As shown in FIG. 7A, the compression/watermark information embedding apparatus 5A includes a block dividing section 11 (image information dividing means), an entropy decoding section 51 (data decompression means), a watermark insertion section 14 (watermark information embedding means), and an entropy encoding section 15 (data compression means).

The block dividing section 11 divides information of one original image into square blocks each having n×n pixels (for example, blocks each having 8×8 pixels).

The entropy decoding section 51 performs entropy decoding on each block.

The watermark insertion section 14 divides the post-entropy decoding DCT coefficients into at least two data streams, and modifies values of AC components of the data streams. Thus, watermark information is embedded in each block of the image information. The above-mentioned modification is performed as follows.

First, the sum of a plurality of data of each data stream (or the sum of a plurality of data of a prescribed portion of each data stream), more specifically, the sum of a plurality of data, each including at least the value of its LSB, of each data stream (or the sum of a plurality of data, each including at least the value of its LSB, of a prescribed portion of each data stream), is obtained. Then, a value of an AC component of each data stream is modified such that the value of the LSB of the obtained sum has a prescribed relationship with (e.g., is equal to) the value of the watermark information.

The entropy encoding section 15 performs entropy encoding on the image data with the watermark information embedded therein.

The embedded watermark information is detected by the decompression/watermark information detection apparatus 2A shown in FIG. 2A.

In this example, the compression/watermark information embedding apparatus 5A (FIG. 7A) encodes the data by the entropy encoding section 15 after the watermark information is embedded, and the decompression/watermark information detection apparatus 2A (FIG. 2A) detects the watermark information using the data obtained by decoding the data of each of the divided blocks by the entropy decoding section 22. The present invention is not limited to this. The present invention is applicable to a watermark information embedding apparatus 5B (FIG. 7B) which does not compress the data, i.e., does not encode the data after the watermark information is embedded. In this case, a watermark information detection apparatus 2B (FIG. 2B) detects the watermark information without decoding the data of each of the divided blocks.

EXAMPLE 4

In the second example, prescribed watermark information is detectably embedded in an original image photographed by, for example, a digital camera. According to a fourth example of the present invention, prescribed watermark information is detectably embedded in data-compressed image information (e.g., JPEG image information) which is to be communicated or stored.

FIG. 8A is a diagram illustrating a structure of a compression/watermark information embedding apparatus 6A according to a fourth example of the present invention. Identical elements previously discussed with respect to FIG. 3A bear identical reference numerals and the detailed descriptions thereof will be omitted.

As shown in FIG. 8A, the compression/watermark information embedding apparatus 6A includes a block dividing section 31 (image information dividing means), an entropy decoding section 61 (data decompression means), a pseudo random number generation section 34 (pseudo random number generation means), a specific bit extraction section 35 (specific bit extraction means), a watermark insertion section 36 (watermark information embedding means), and an entropy encoding section 37 (data compression means).

The block dividing section 31 divides information of one original image into square blocks each having n×n pixels (for example, blocks each having 8×8 pixels).

The entropy decoding section 61 performs entropy decoding on each block.

The pseudo random number generation section 34 generates a first pseudo random number and a second pseudo random number.

The specific bit extraction section 35 extracts a specific bit from a DC component of the post-entropy decoding DCT coefficients.

The watermark insertion section 36 divides the post-entropy decoding DCT coefficients into at least two data streams (e.g., a first data stream and a second data stream), and modifies values of AC components of the data streams. Thus, watermark information is embedded in each block of the image information. The above-mentioned modification is performed as follows.

First, the sum of a plurality of data of the first data stream (or the sum of a plurality of data of a prescribed portion of the first data stream), more specifically, the sum of a plurality of data, each including at least the value of its LSB, of the first data stream (or the sum of a plurality of data, each including at least the value of its LSB, of a prescribed portion of the first data stream), is obtained. Then, a value of an AC component of the first data stream is modified such that the value of the LSB of the obtained sum has a prescribed relationship with (e.g., is equal to) the exclusive-OR of (i) the value of the watermark information, (ii) the value of the specific bit, and (iii) the value of the first pseudo random number. Similarly, the sum of a plurality of data of the second data stream (or the sum of a plurality of data of a prescribed portion of the second data stream), more specifically, the sum of a plurality of data, each including at least the value of its LSB, of the second data stream (or the sum of a plurality of data, each including at least the value of its LSB, of a prescribed portion of the second data stream), is obtained. Then, a value of an AC component of the second data stream is modified such that the value of the LSB of the obtained sum has a prescribed relationship with (e.g., is equal to) the exclusive-OR of (i) the value of the watermark information, (ii) the value of the specific bit, and (iii) the value of the second pseudo random number.

The entropy encoding section 37 performs entropy encoding on the image data with the watermark information embedded therein.

The embedded watermark information is detected by the decompression/watermark information detection apparatus 4A shown in FIG. 4A.

In this example, the compression/watermark information embedding apparatus 6A (FIG. 8A) encodes the data by the entropy encoding section 37 after the watermark information is embedded, and the decompression/watermark information detection apparatus 4A (FIG. 4A) detects the watermark information using the data obtained by decoding the data of each of the divided blocks by the entropy decoding section 42. The present invention is not limited to this. The present invention is applicable to a watermark information embedding apparatus 6B (FIG. 8B) which does not compress the data, i.e., does not encode the data after the watermark information is embedded. In this case, a watermark information detection apparatus 4B (FIG. 4B) detects the watermark information without decoding the data of each of the divided blocks.

EXAMPLE 5

According to a fifth example of the present invention, quantization is performed after watermark information is embedded, instead of embedding watermark information after quantization is performed as in the first and second examples.

Figure 9A:
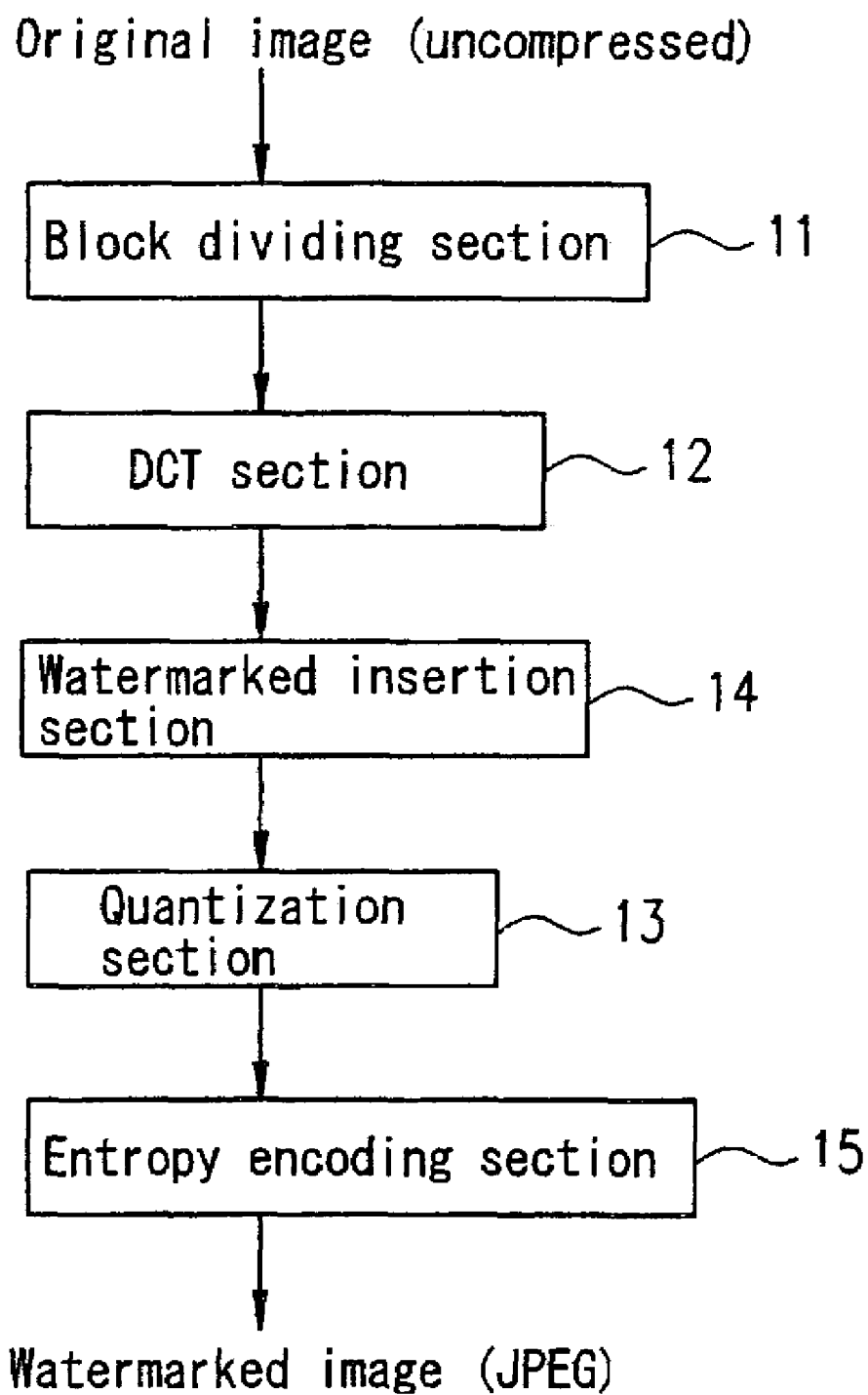
FIG. 9A is a diagram illustrating a structure of a compression/watermark information embedding apparatus according to a fifth example of the present invention.

FIG. 9A is a diagram illustrating a structure of a compression/watermark information embedding apparatus 7A according to a fifth example of the present invention. Identical elements previously discussed with respect to FIG. 1A bear identical reference numerals and the detailed descriptions thereof will be omitted.

As shown in FIG. 9A, the compression/watermark information embedding apparatus 7A is different from the compression/watermark information embedding apparatus 1A shown in FIG. 1A in that the quantization section 13 and the watermark insertion section 14 are provided such that the data is processed by these sections in the opposite order. A decompression/watermark information detection apparatus corresponding to the compression/watermark information embedding apparatus 7A needs to include a dequantization section between the entropy decoding section 22 and the watermark insertion section 23 (see FIG. 2A) so as to retrieve watermark information from the dequantized data. Values of AC components of two divided data streams are set such that the first DC component having a value of Q or higher from the trailing end of each data stream is processed by addition of Q or subtraction of Q. Here, Q is a quantization divisor (quantization step).

Figure 10A:
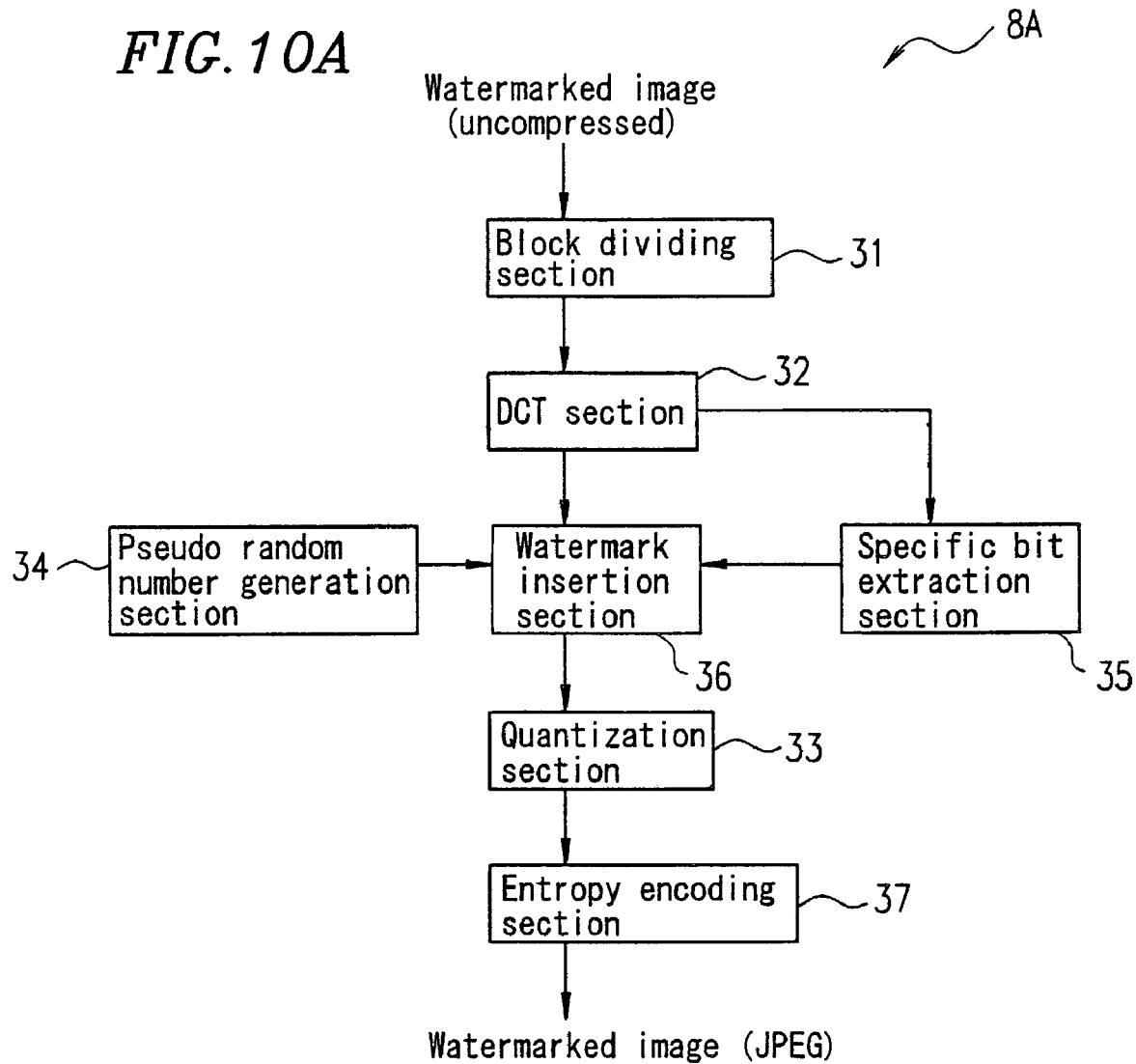
FIG. 10A is a diagram illustrating a structure of a compression/watermark information embedding apparatus according to the fifth example of the present invention.
Figure 11:
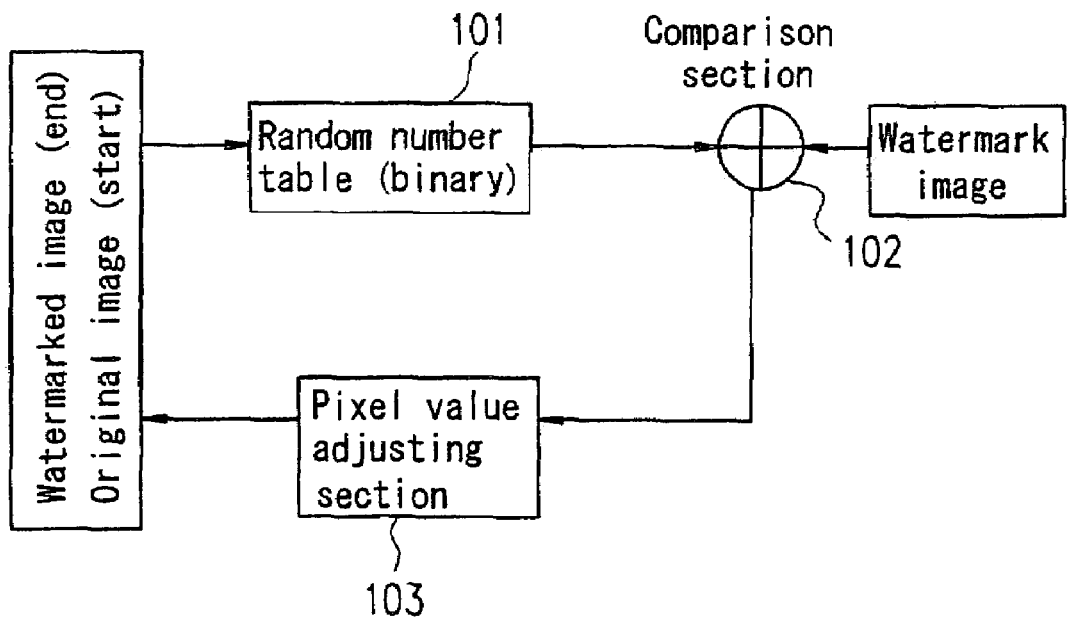
FIG. 11 is a functional diagram illustrating a procedure performed by a conventional watermark information embedding apparatus.
Figure 12:
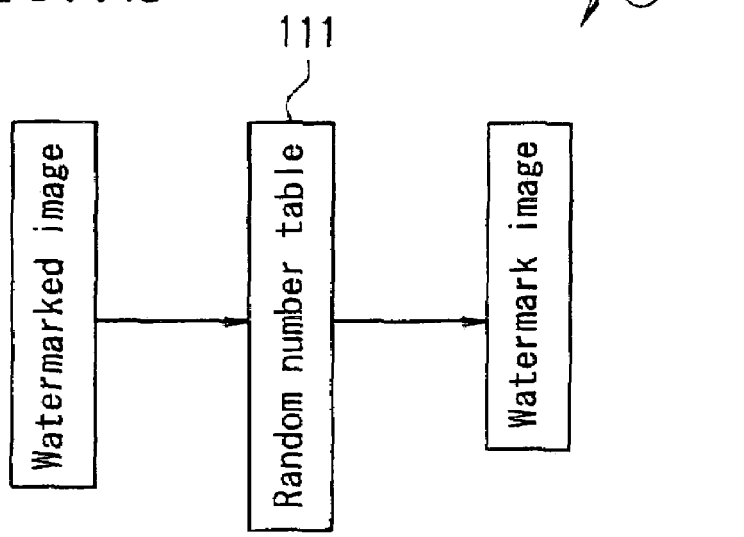
FIG. 12 is a functional diagram illustrating a procedure performed by a conventional watermark information detection apparatus.
Figure 13:
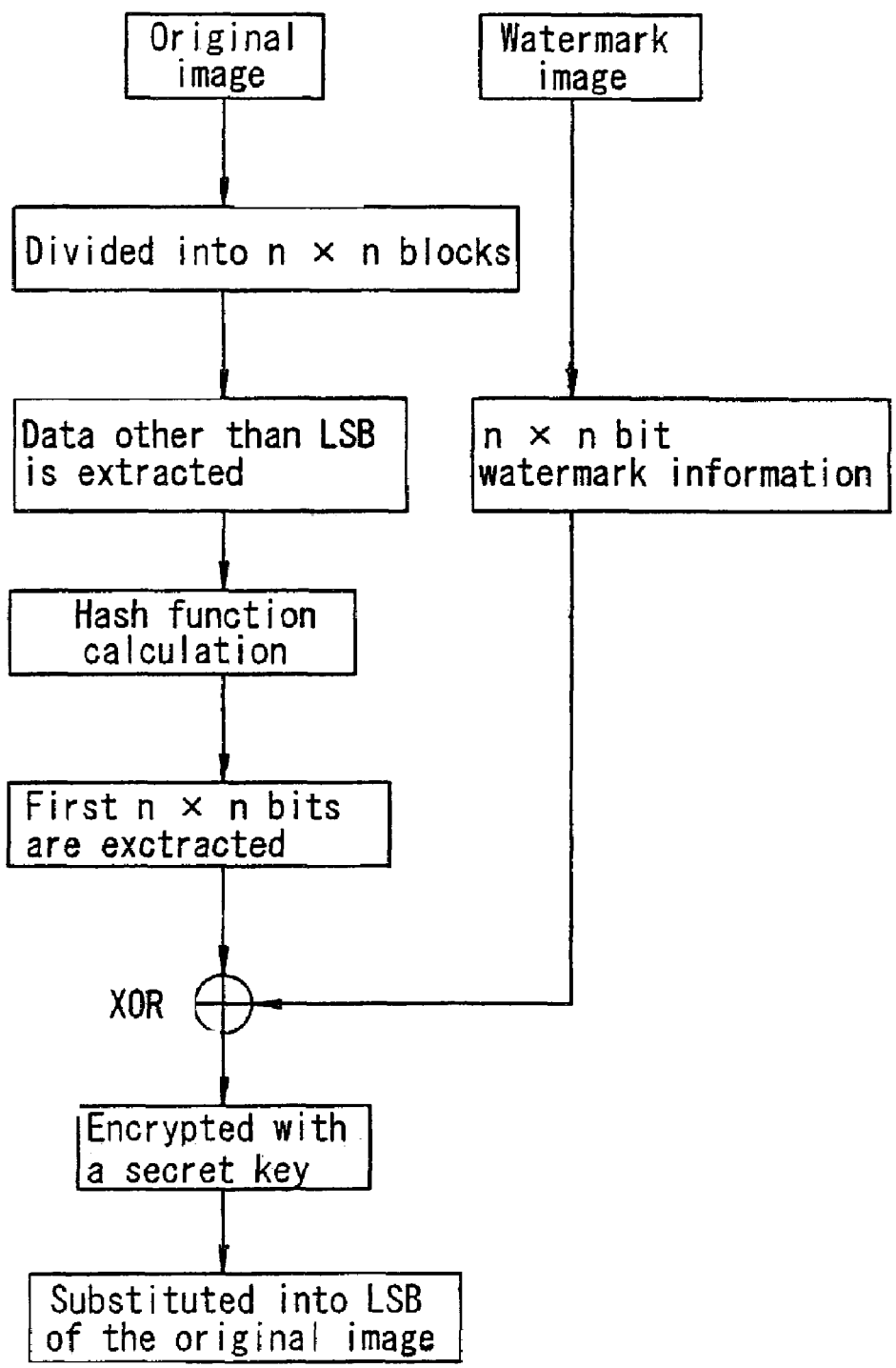
FIG. 13 is a functional diagram illustrating a procedure performed by another conventional watermark information embedding apparatus.
Figure 14:
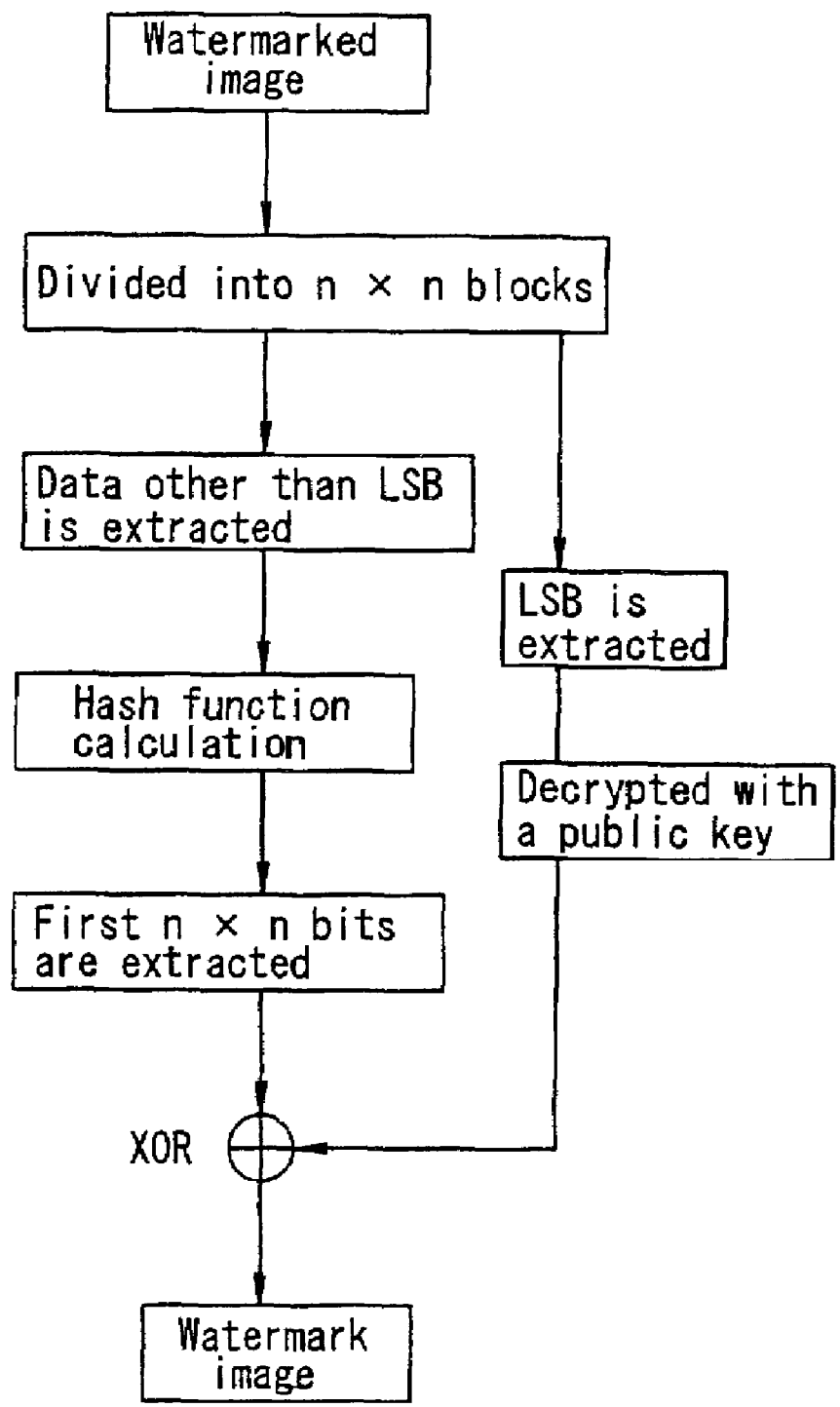
FIG. 14 is a functional diagram illustrating a procedure performed by another conventional watermark information detection apparatus.
Figure 15:
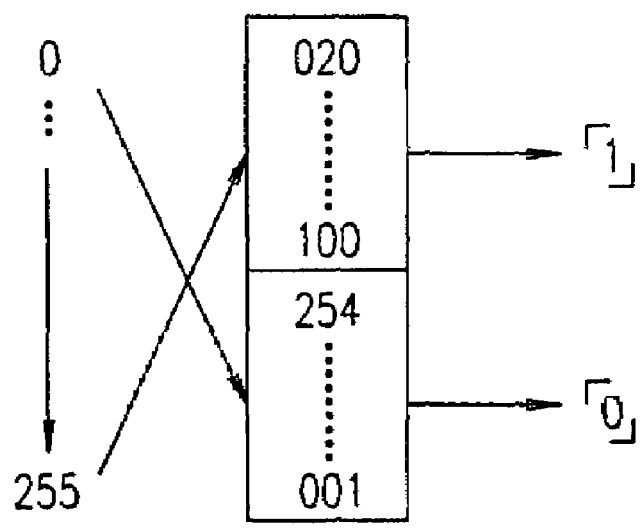
FIG. 15 shows transform shown in FIG. 12.

FIG. 10A is a diagram illustrating a structure of a compression/watermark information embedding apparatus 8A according to the fifth example of the present invention. Identical elements previously discussed with respect to FIG. 3A bear identical reference numerals and the detailed descriptions thereof will be omitted.

As shown in FIG. 10A, the compression/watermark information embedding apparatus 8A is different from the compression/watermark information embedding apparatus 3A shown in FIG. 3A in that the quantization section 33 and the watermark insertion section 34 are provided such that the data is processed by these sections in the opposite order. A decompression/watermark information detection apparatus corresponding to the compression/watermark information embedding apparatus 8A needs to include a dequantization section between the entropy decoding section 42 and the watermark insertion section 43 (see FIG. 4A) so as to retrieve watermark information from the dequantized data. Values of AC components of two divided data streams are set such that the first DC component having a value of Q or higher from the trailing end of one of the data streams is processed by addition of Q or subtraction of Q, and the first DC component having a value of Q or higher from the trailing end of the other data stream is processed by addition of Q or subtraction of Q.

In this example, the compression/watermark information embedding apparatus 7A (FIG. 9A) encodes the data by the entropy encoding section 15 after the watermark information is embedded, and the decompression/watermark information detection apparatus 2A (FIG. 2A) detects the watermark information using the data obtained by decoding the data of each of the divided blocks by the entropy decoding section 22. The present invention is not limited to this. The present invention is applicable to a watermark information embedding apparatus 7B (FIG. 9B) which does not compress the data, i.e., does not encode the data after the watermark information is embedded. In this case, a watermark information detection apparatus 2B (FIG. 2B) detects the watermark information without decoding the data of each of the divided blocks.

In this example, the compression/watermark information embedding apparatus 8A (FIG. 10A) encodes the data by the entropy encoding section 37 after the watermark information is embedded, and the decompression/watermark information detection apparatus 4A (FIG. 4A) detects the watermark information using the data obtained by decoding the data of each of the divided blocks by the entropy decoding section 42. The present invention is not limited to this. The present invention is applicable to a watermark information embedding apparatus 8B (FIG. 10B) which does not compress the data, i.e., does not encode the data after the watermark information is embedded. In this case, a watermark information detection apparatus 4B (FIG. 4B) detects the watermark information without decoding the data of each of the divided blocks.

The present invention described so far provides the following effects.

(1) Data changes are difficult. Since the DC component of the image is involved in the data change, it is impossible to create a watermarked image using only AC components.

(2) The influence of embedding of watermarking information on the image quality is insignificant, since only the high frequency components, which are not important for the image quality, are modified.

(3) The secrecy is high. Since random numbers are used, there is no regularity. The algorithm is variable, and there are many variations. The above-described algorithm is merely one example, and there are many other usable algorithms. For example, S1 and S2 may be determined as shown in Table 2 instead of Table 1. For embedding expressions (7a) and (7b), other image information can be reflected.

Figure 16:
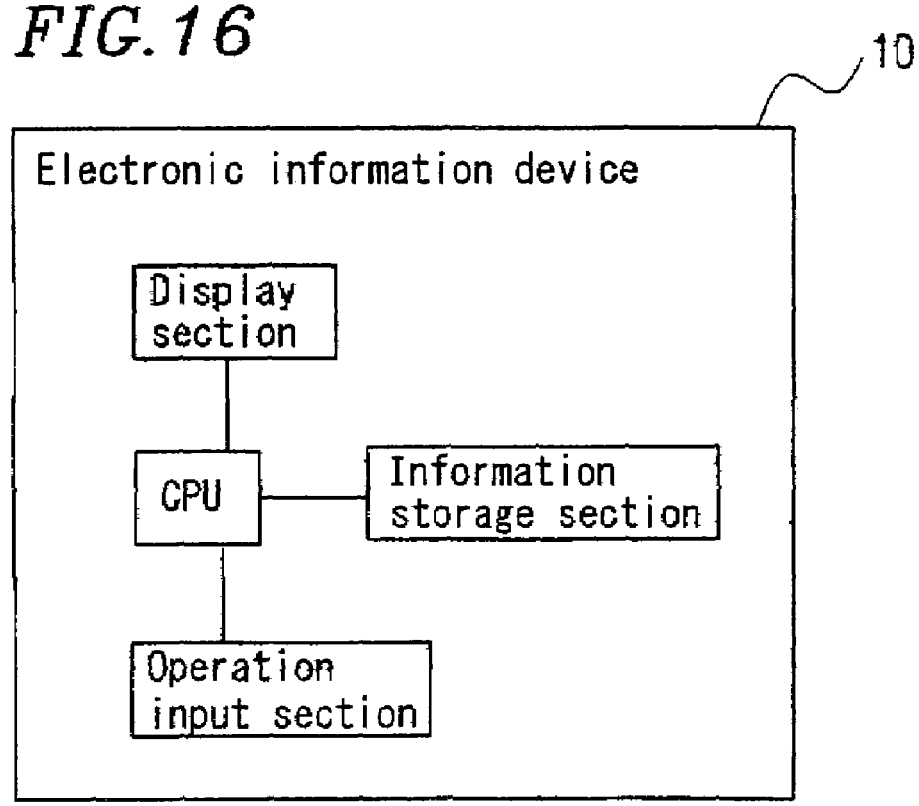
FIG. 16 is a block diagram illustrating a structure of an electronic information apparatus according to the present invention.

In the first through fifth examples, the compression/watermark information embedding apparatuses 1, 3, 5 through 8, and the decompression/watermark information detection apparatuses 2 and 4 are described. These apparatuses may be incorporated into an electronic information apparatuses which require data compression, such as, for example, digital cameras, cellular phones and computers. In this case, the present invention provides the effect of authenticating an original image. The sections of these apparatuses may be implemented by hardware such as circuits, or software based on control programs as an electronic information apparatus 10 shown in FIG. 16. The electronic information apparatus 10 includes an information storage section such as a RAM or a ROM, an operation input section, a display section for displaying an initial screen or an information processing result, such as an LCD device, and a CPU (central processing unit). In response to a control instruction from the operation input section, the CPU performs data compression/watermark information embedding processing and data decompression/watermark information detection processing using the image processing apparatus according to the present invention based on the prescribed control program for information processing or data thereof, as well as performing various types of information processing (communication or storage).

A control program corresponding to the first example of the present invention performs watermark information embedding processing, which includes the steps of dividing the original image information into n×n blocks; performing discrete cosine transforms of the image information on a block-by-block basis; quantizing discrete cosine coefficients produced by the discrete cosine transform; dividing the quantized discrete cosine coefficients into at least two data streams, and setting the value of an AC component of each of the data streams such that the value of the LSB of the sum of a plurality of data of each of the data streams (or the value of the LSB of the sum of a plurality of data of a prescribed portion of each of the data streams), more specifically, the sum of a plurality of data, each including at least the value of its LSB, of each data stream (or the sum of a plurality of data, each including at least the value of the LSB, of a prescribed portion of each data stream), is in a prescribed relationship with (for example, is equal to) the value of the watermark information, so as to embed the watermark information in the original image information; and encoding data after the watermark information is embedded for data compression.

The control program also performs watermark information detection processing, which includes dividing the image information having the watermark information embedded therein into n×n blocks; decoding data of each of the divided blocks for data decompression; and dividing decoded discrete cosine coefficients into at least two data streams, and detecting the watermark information depending on whether the values of the LSBs of the sums of a plurality of data of the data streams (or the values of the LSBs of sums of a plurality of data of prescribed portions of the data streams), more specifically, the sums of a plurality of data, each including at least the value of its LSB, of the data streams (or the sums of a plurality of data, each including at least the value of its LSB, of prescribed portions of the data streams), are in a prescribed relationship with each other.

A control program corresponding to the second example of the present invention performs watermark information embedding processing, which includes the steps of dividing the original image information into n×n blocks; performing discrete cosine transforms of the image information on a block-by-block basis; quantizing discrete cosine coefficients produced by the discrete cosine transform; generating at least a first pseudo random number and a second pseudo random number; extracting a specific bit from a DC coefficient of the quantized discrete cosine coefficients; dividing the quantized discrete cosine coefficients into at least a first data stream and a second data stream; setting the value of an AC component of the first data stream such that the value of the LSB of the sum of a plurality of data of the first data stream (or the value of the LSB of the sum of a plurality of data of a prescribed portion of the first data stream), more specifically, the sum of a plurality of data, each including at least the value of its LSB, of the first data stream (or the sum of a plurality of data, each including at least the value of its LSB, of a prescribed portion of the first data stream), is in a prescribed relationship with (for example, is equal to) the exclusive-OR (or the exclusive-NOR) of the value of the watermark information, the value of the specific bit, and the value of the first pseudo random number; and setting the value of an AC component of the second data stream such that the value of the LSB of the sum of a plurality of data of the second data stream (or the value of the LSB of the sum of a plurality of data of a prescribed portion of the second data stream), more specifically, the sum of a plurality of data, each including at least the value of its LSB, of the second data stream (or the sum of a plurality of data, each including at least the value of its LSB, of a prescribed portion of the second data stream), is in a prescribed relationship with (for example, is equal to) the exclusive-OR (or the exclusive-NOR) of the value of the watermark information, the value of the specific bit, and the value of the second pseudo random number; so as to embed the watermark information in the original image information; and encoding the data after the watermark information is embedded for data compression.

The control program also performs watermark information detection processing, which includes the steps of dividing the image information having the watermark information embedded therein into n×n blocks; generating at least a first pseudo random number and a second pseudo random number; decoding data of each of the divided blocks for data decompression; extracting a specific bit from a DC coefficient of the decoded discrete cosine coefficients; and dividing the decoded discrete cosine coefficients into at least a first data stream and a second data stream, and detecting the watermark information depending on whether the exclusive-OR (or the exclusive-NOR) of the value of the LSB of the sum of a plurality of data of the first data stream (or the sum of a plurality of data of a prescribed portion of the first data stream), more specifically, the sum of a plurality of data, each including at least the value of its LSB, of the first data stream (or the sum of a plurality of data, each including at least the value of its LSB, of a prescribed portion of the first data stream), the value of the specific bit, and the value of the first pseudo random number is in a prescribed relationship with the exclusive-OR (or the exclusive-NOR) of the value of the LSB of the sum of a plurality of data of the second data stream (or the sum of a plurality of data of a prescribed portion of the second data stream), more specifically, the sum of a plurality of data, each including at least the value of its LSB, of the second data stream (or the sum of a plurality of data, each including at least the value of its LSB, of a prescribed portion of the second data stream), the value of the specific bit, and the value of the second pseudo random number.

The present invention relates to weak watermark technology.

According to the present invention, the quantized discrete cosine coefficients are divided into at least two data streams, and the value of an AC component of each of the data streams is set such that the value of the LSB of, for example, the sum of a plurality of data of each of the data streams is in a prescribed relationship with (for example, is equal to) the value of the watermark information. Thus, the watermark information is embedded in the original image information. Therefore, embedding of the watermark information does not have any adverse influence on the image quality. Any change in the original data can be sensitively recognized. The watermark information is difficult to be forged, and is easily applicable to data-compressed images.

Also according to the present invention, the quantized discrete cosine coefficients are divided into at least two data streams (for example, a first data stream and a second data stream), and the value of an AC component of the first data stream is set such that the value of the LSB of, for example, the sum of a plurality of data of the first data stream is in a prescribed relationship with (for example, is equal to), for example, the exclusive-OR of (i) the value of the watermark information, (ii) the value of the specific bit, and (iii) the value of the first pseudo random number. The value of an AC component of the second data stream is set such that the value of the LSB of, for example, the sum of a plurality of data of the second data stream is in a prescribed relationship with(for example, is equal to), for example, the exclusive-OR of (i) the value of the watermark information, (ii) the value of the specific bit, and (iii) the value of the second pseudo random number. Thus, the watermark information is embedded in the original image information. In this case, the above-mentioned effects of the present invention, i.e., (a) embedding of the watermark information does not have any adverse influence on the image quality; (b) any change in the original data can be sensitively recognized; and (c) the watermark information is difficult to be forged; and (d) the watermark information is easily applicable to data-compressed images are more surely guaranteed.

The present invention may be incorporated into a camera for photographing images usable as evidence in the fields of policing, architecture, criminal investigation, and security. These images assist realization of rapid and fair trials. The present invention may be incorporated into X ray or CT scanning apparatuses or other medical apparatuses. In this case, strong evidence can be provided regarding medical accidents. The present invention may also be used for secret communication for important data, in which case one piece of data is selected from a plurality of pieces of data for confirming watermark information.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus for detectably embedding prescribed watermark information in original image information, comprising:
    an original image information dividing section for dividing the original image information into n×n blocks (n is a natural number);
    a discrete cosine transform section for performing discrete cosine transforms of the image information on a block-by-block basis;
    a quantization section for quantizing discrete cosine coefficients produced by the discrete cosine transform; and
    a watermark information embedding section for dividing the quantized discrete cosine coefficients into at least two data streams, and setting the value of an AC component of each of the data streams such that the value of the least significant bit of the sum of a plurality of data of each of the data streams, or the value of the least significant bit of the sum of a plurality of data of a prescribed portion of each of the data streams, is in a prescribed relationship with the value of the watermark information, so as to embed the watermark information in the original image information.

2. An image processing apparatus according to claim 1, further comprising a data compression section for encoding data after the watermark information is embedded and after the discrete cosine coefficients are quantized.

3. An image processing apparatus according to claim 1, wherein the prescribed relationship is such that the value of the least significant bit of the sum of a plurality of data of each of the data streams, or the value of the least significant bit of the sum of a plurality of data of a prescribed portion of each of the data streams, is equal to or different from the value of the watermark information.

4. An image processing apparatus according to claim 1, wherein the value of the AC component is set by adding 1 to, or subtracting 1 from, the first non-zero AC component in a direction from a trailing end toward a leading end of each of the data streams.

5. An image processing apparatus according to claim 1, wherein the sum of a plurality of data of each of the data streams, or the sum of a plurality of data of a prescribed portion of each of the data streams, is the sum of a plurality of data, each including the value of its least significant bit, of each of the data streams, or the sum of a plurality of data, each including the value of its least significant bit, of a prescribed portion of each of the data streams.

6. An electronic information apparatus for embedding watermark information using an image processing apparatus according to claim 1.

7. An image processing apparatus for detecting prescribed watermark information embedded in original image information, comprising:
    an image information dividing section for dividing the image information having the watermark information embedded therein into n×n blocks (n is a natural number); and
    a watermark information detection section for dividing post-division discrete cosine coefficients into at least two data streams, and detecting the watermark information depending on whether the values of the least significant bits of the sums of a plurality of data of the data streams, or the values of the least significant bits of sums of a plurality of data of prescribed portions of the data streams, are in a prescribed relationship with each other.

8. An image processing apparatus according to claim 7, further comprising a data decompression section for decoding data of each of the divided blocks, wherein the watermark information detection section operates using the decoded data.

9. An image processing apparatus according to claim 7, wherein the sum of a plurality of data of each of the data streams, or the sum of a plurality of data of a prescribed portion of each of the data streams, is the sum of a plurality of data, each including the value of its least significant bit, of each of the data streams, or the sum of a plurality of data, each including the value of its least significant bit, of a prescribed portion of each of the data streams.

10. An electronic information apparatus for detecting watermark information using an image processing apparatus according to claim 7.

11. An image processing system, comprising:
    an image processing apparatus according to claim 1; and
    an image processing apparatus according to claim 7.

12. An electronic information apparatus for embedding and detecting watermark information using an image processing system according to claim 11.

13. An image processing apparatus for detectably embedding prescribed watermark information in original image information, comprising:
- an original image information dividing section for dividing the original image information into n×n blocks (n is a natural number);
- a discrete cosine transform section for performing discrete cosine transforms of the image information on a block-by-block basis;
- a quantization section for quantizing discrete cosine coefficients produced by the discrete cosine transform;
- a pseudo random number generation section for generating at least a first pseudo random number and a second pseudo random number;
- a specific bit extraction section for extracting a specific bit from a DC coefficient of the quantized discrete cosine coefficients; and
- a watermark information embedding section for dividing the quantized discrete cosine coefficients into at least a first data stream and a second data stream; setting the value of an AC component of the first data stream such that the value of the least significant bit of the sum of a plurality of data of the first data stream, or the value of the least significant bit of the sum of a plurality of data of a prescribed portion of the first data stream, is in a prescribed relationship with the exclusive-OR or the exclusive-NOR of the value of the watermark information, the value of the specific bit, and the value of the first pseudo random number; and setting the value of an AC component of the second data stream such that the value of the least significant bit of the sum of a plurality of data of the second data stream, or the value of the least significant bit of the sum of a plurality of data of a prescribed portion of the second data stream, is in a prescribed relationship with the exclusive-OR or the exclusive-NOR of the value of the watermark information, the value of the specific bit, and the value of the second pseudo random number; so as to embed the watermark information in the original image information.

14. An image processing apparatus according to claim 13, further comprising a data compression section for encoding data after the watermark information is embedded and after the discrete cosine coefficients are quantized.

15. An image processing apparatus according to claim 13, wherein the prescribed relationship is such that the value of the least significant bit of the sum of a plurality of data of the first data stream, or the value of the least significant bit of the sum of a plurality of data of a prescribed portion of the first data stream, is equal to or different from the exclusive-OR or the exclusive-NOR of the value of the watermark information, the value of the specific bit, and the value of the first pseudo random number; and such that the value of the least significant bit of the sum of a plurality of data of the second data stream, or the value of the least significant bit of the sum of a plurality of data of a prescribed portion of the second data stream, is equal to or different from the exclusive-OR or the exclusive-NOR of the value of the watermark information, the value of the specific bit, and the value of the second pseudo random number.

16. An image processing apparatus according to claim 13, wherein the value of the AC component of the first data stream is set by adding 1 to, or subtracting 1 from, the first non-zero AC component in a direction from the trailing end toward the leading end of the first data stream, and the value of the AC component of the second data stream is set by adding 1 to, or subtracting 1 from, the first non-zero AC component in a direction from the trailing end toward the leading end of the second data stream.

17. An image processing apparatus according to claim 13, wherein:
- the exclusive-OR is the exclusive-OR: of the exclusive-OR of two out of three inputs of (i) the value of the watermark information, (ii) the value of the specific bit, and (iii) the value of the first or the second pseudo random number, and the remaining one input; and
- the exclusive-NOR is a negative value of the exclusive-OR of: a negative value of the exclusive-OR of two out of three inputs of (i) the value of the watermark information, (ii) the value of the specific bit, and (iii) the value of the first or the second pseudo random number, and a the remaining one input.

18. An image processing apparatus according to claim 13, wherein the sum of a plurality of data of each of the data streams, or the sum of a plurality of data of a prescribed portion of each of the data streams, is the sum of a plurality of data, each including the value of its least significant bit, of each of the data streams, or the sum of a plurality of data, each including the value of its least significant bit, of a prescribed portion of each of the data streams.

19. An electronic information apparatus for embedding watermark information using an image processing apparatus according to claim 13.

20. An image processing apparatus for detecting prescribed watermark information embedded in original image information, comprising:
- an image information dividing section for dividing the image information having the watermark information embedded therein into n×n blocks (n is a natural number);
- a pseudo random number generation section for generating at least a first pseudo random number and a second pseudo random number;
- a specific bit extraction section for extracting a specific bit from a DC coefficient of post-division discrete cosine coefficients;
- a watermark information detection section for dividing the post-division discrete cosine coefficients into at least a first data stream and a second data stream, and detecting the watermark information depending on whether the exclusive-OR or the exclusive-NOR of the value of the least significant bit of the sum of a plurality of data of the first data stream or the value of the least significant bit of the sum of a plurality of data of a prescribed portion of the first data stream, the value of the specific bit, and the value of the first pseudo random number is in a prescribed relationship with the exclusive-OR or the exclusive-NOR of the value of the least significant bit of the sum of a plurality of data of the second data stream or the value of the least significant bit of the sum of a plurality of data of a prescribed portion of the second data stream, the value of the specific bit, and the value of the second pseudo random number.

21. An image processing apparatus according to claim 20, further comprising a data decompression section for decoding data of each of the divided blocks, wherein the watermark information detection section operates using the decoded data.

22. An image processing apparatus according to claim 20, wherein:
- the exclusive-OR is the exclusive-OR of: the exclusive-OR of two out of three inputs of (i) the value of the watermark information, (ii) the value of the specific bit, and (iii) the value of the first or the second pseudo random number, and the remaining one input; and the exclusive-NOR is a negative value of the exclusive-OR of: a negative value of the exclusive-OR of two out of three inputs of (i) the value of the watermark information, (ii) the value of the specific bit, and (iii) the value of the first or the second pseudo random number, and a the remaining one input.

23. An image processing apparatus according to claim 20, wherein the sum of a plurality of data of each of the data streams, or the sum of a plurality of data of a prescribed portion of each of the data streams, is the sum of a plurality of data, each including the value of its least significant bit, of each of the data streams, or the sum of a plurality of data, each including the value of its least significant bit, of a prescribed portion of each of the data streams.

24. An electronic information apparatus for detecting watermark information using an image processing apparatus according to claim 20.

25. An image processing system, comprising:
an image processing apparatus according to claim 13; and
an image processing apparatus according to claim 20.

26. An electronic information apparatus for embedding and detecting watermark information using an image processing system according to claim 12.

27. An image processing method for detectably embedding prescribed watermark information in original image information, comprising the steps of:

dividing the original image information into n×n blocks (n is a natural number);

performing discrete cosine transforms of the image information on a block-by-block basis;

quantizing discrete cosine coefficients produced by the discrete cosine transform;

dividing the quantized discrete cosine coefficients into at least two data streams, and setting the value of an AC component of each of the data streams such that the value of the least significant bit of the sum of a plurality of data of each of the data streams, or the value of the least significant bit of the sum of a plurality of data of a prescribed portion of each of the data streams, is in a prescribed relationship with the value of the watermark information, so as to embed the watermark information in the original image information; and encoding data after the watermark information is embedded for data compression.

28. A control program describing a processing procedure for allowing a computer to execute an image processing method according to claim 27.

29. A computer-readable recording medium having a control program according to claim 28 recorded thereon.

* * * * *